US011982967B2

(12) United States Patent
Tanaka

(10) Patent No.: US 11,982,967 B2
(45) Date of Patent: May 14, 2024

(54) SHEET TRANSPORT DEVICE AND IMAGE FORMING APPARATUS

(71) Applicant: FUJIFILM BUSINESS INNOVATION CORP., Tokyo (JP)

(72) Inventor: Kei Tanaka, Ebina (JP)

(73) Assignee: FUJIFILM Business Innovation Corp., Tokyo (JP)

(*) Notice: Subject to any disclaimer, the term of this patent is extended or adjusted under 35 U.S.C. 154(b) by 212 days.

(21) Appl. No.: 17/557,918

(22) Filed: Dec. 21, 2021

(65) Prior Publication Data

US 2022/0184975 A1 Jun. 16, 2022

Related U.S. Application Data

(63) Continuation of application No. PCT/JP2020/022186, filed on Jun. 4, 2020.

(30) Foreign Application Priority Data

Aug. 16, 2019 (JP) ................................ 2019-149260

(51) Int. Cl.

| | |
|---|---|
| ***B41J 2/01*** | (2006.01) |
| ***B41J 11/00*** | (2006.01) |
| ***B41J 13/076*** | (2006.01) |
| ***G03G 15/00*** | (2006.01) |

(52) U.S. Cl.

CPC ............ *G03G 15/6529* (2013.01); *B41J 2/01* (2013.01); *B41J 11/0045* (2013.01); *B41J 13/076* (2013.01); *B41J 2002/012* (2013.01)

(58) Field of Classification Search

CPC ........ B41J 11/0045; B41J 13/076; B41J 2/01; B41J 2002/012; B41J 13/00; B41J 13/0009; G03G 15/6529; G03G 15/657; B65H 5/02; B65H 3/06

See application file for complete search history.

(56) References Cited

U.S. PATENT DOCUMENTS

| | | | |
|---|---|---|---|
| 2005/0242494 | A1 | 11/2005 | Gunschera et al. |
| 2009/0244243 | A1 | 10/2009 | Nakagawa et al. |

FOREIGN PATENT DOCUMENTS

| | | | |
|---|---|---|---|
| CN | 1706735 | A | 12/2005 |
| CN | 107352298 | A | 11/2017 |
| DE | 10 2010 001 491 | A1 | 8/2011 |
| EP | 2 189 406 | A1 | 5/2010 |
| JP | H06-047283 | A | 2/1994 |
| JP | 2009-262537 | A | 11/2009 |

(Continued)

OTHER PUBLICATIONS

Aug. 11, 2020 International Search Report issued in International Patent Application No. PCT/JP2020/022186.

(Continued)

*Primary Examiner* — Kristal Feggins

(74) *Attorney, Agent, or Firm* — Oliff PLC

(57) ABSTRACT

A sheet transport device includes: a chain that circulates and moves; a driving unit that circulates and moves the chain; a holding unit that is provided on the chain and holds an end portion of a sheet along a transport direction of the sheet; and a first positioning portion that positions the holding unit on both sides along a direction intersecting both the transport direction of the sheet and a width direction of the sheet while the chain moves along the driving unit.

18 Claims, 18 Drawing Sheets

(56) References Cited

FOREIGN PATENT DOCUMENTS

WO 2009/037865 A1 3/2009

OTHER PUBLICATIONS

Aug. 11, 2020 Written Opinion issued in International Patent Application No. PCT/JP2020/022186.
Jun. 20, 2023 Office Action issued in Japanese Patent Application No. 2019-149260.
Mar. 31, 2023 Office Action Issued in Chinese Patent Application No. 202080057042.2.
Oct. 11, 2023 Office Action issued in Chinese Patent Application No. 202080057042.2.
Oct. 24, 2023 Office Action issued in Japanese Patent Application No. 2019-149260.

SHEET TRANSPORT DEVICE AND IMAGE FORMING APPARATUS

CROSS-REFERENCE TO RELATED APPLICATIONS

This is a continuation of International Application No. PCT/JP2020/022186 filed on Jun. 4, 2020, and claims priority from Japanese Patent Application No. 2019-149260 filed on Aug. 16, 2019.

BACKGROUND

Technical Field

The present disclosure relates to a sheet transport device and an image forming apparatus.

Related Art

As for a sheet transport device, for example, a technique for transporting recording sheet using a chain gripper has been proposed (see JP-A-06-047283).

In JP-A-06-047283, each of left and right holders of each chain gripper pivotally mounted on a chain is provided with a roller follower for vertical positioning that is engaged with and guided to an inner circumferential surface of a gripper guide that is in parallel with a chain guide on a frame, a cam follower for front-rear positioning that is engaged with a V block fixed to a printing cylinder, and a pin for positioning in a cylinder axial direction that is slidably engaged with a concave groove-shaped block fixed to the printing cylinder so as to open in a circumferential direction of the printing cylinder.

SUMMARY

Aspects of non-limiting embodiments of the present disclosure relate to improvement in transport accuracy of a sheet held and transported by a holding section as compared with a case without a first positioning portion that positions a holding section provided on a chain on both sides along a direction intersecting both a transport direction of the sheet and a surface of the sheet.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a sheet transport device including: a chain that circulates and moves; a driving unit that circulates and moves the chain; a holding unit that is provided on the chain and holds an end portion of a sheet along a transport direction of the sheet; and a first positioning portion that positions the holding unit on both sides along a direction intersecting both the transport direction of the sheet and a width direction of the sheet while the chain moves along the driving unit.

BRIEF DESCRIPTION OF DRAWINGS

Exemplary embodiment(s) of the present invention will be described in detail based on the following figures, wherein.

DETAILED DESCRIPTION

Hereinafter, exemplary embodiments of the present disclosure will be described with reference to the drawings.

First Exemplary Embodiment

Figure 1:
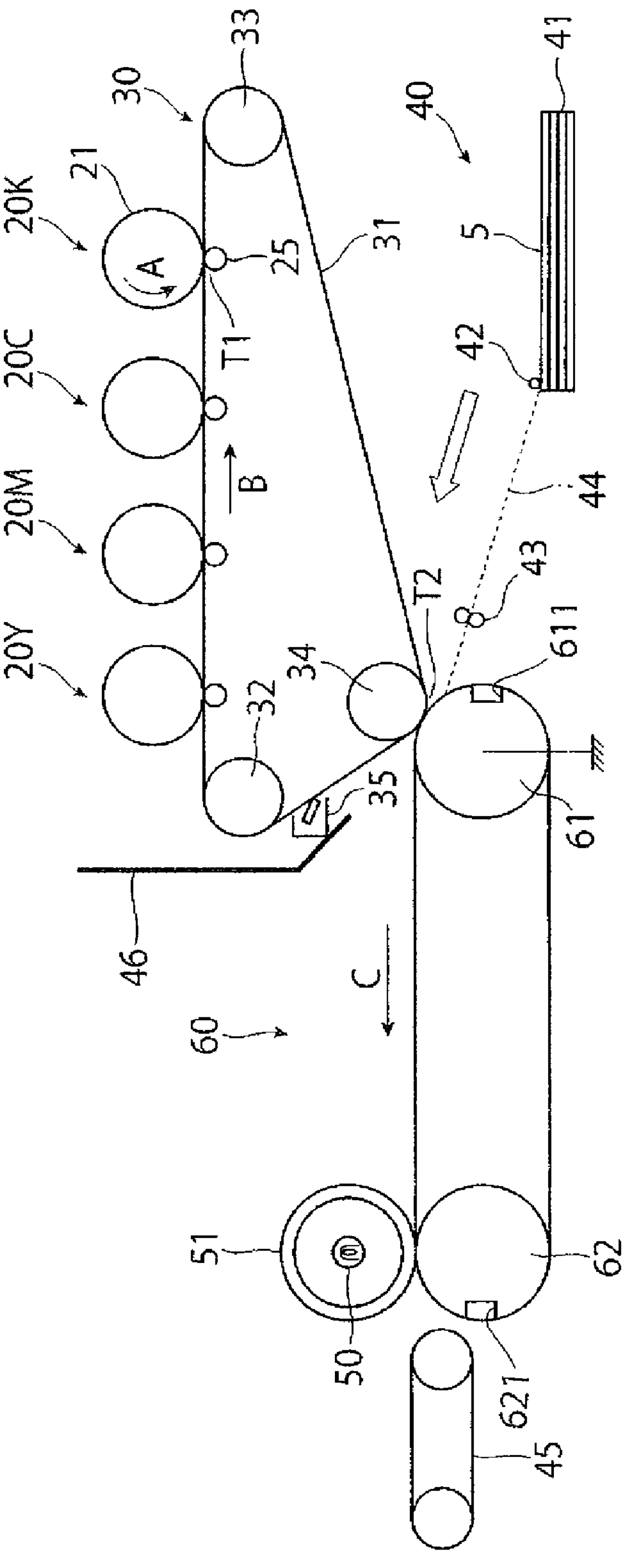
FIG. 1 is a schematic configuration diagram showing an image forming apparatus to which a sheet transport device according to a first exemplary embodiment of the present disclosure is applied.

FIG. 1 shows an overall outline of an image forming apparatus to which a sheet transport device according to a first exemplary embodiment is applied.

<Overall Configuration of Image Forming Apparatus>

An image forming apparatus 1 according to the first exemplary embodiment is, for example, a color printer employing an electrophotographic system. As shown in FIG. 1, the image forming apparatus 1 includes plural image forming devices 20 that form a toner image to be developed with a toner forming a developer, an intermediate transfer device 30, a sheet feeding device 40, a sheet transport device 60, and the like. The intermediate transfer device 30 holds the toner image formed by each image forming device 20, and transports the toner image to a secondary transfer position T2 where the toner image is finally secondarily transferred to a recording sheet 5 as an example of a recording medium (sheet). The sheet feeding device 40 accommodates and transports the required recording sheet 5 to be supplied to the secondary transfer position T2 on the intermediate transfer device 30. The sheet transport device 60 transports the toner image from the intermediate transfer device 30 to the secondary transfer position T2 where the toner image is secondarily transferred in a state of holding the recording sheet 5 supplied from the sheet feeding device 40, and also serves as a fixing device that fixes an unfixed toner image to the recording sheet 5 onto which the toner image is secondarily transferred.

In the first exemplary embodiment, the plural image forming devices 20 and the intermediate transfer device 30 form an image forming unit that forms the toner image on the recording sheet 5. The image forming unit may include a single image forming device, or may directly form the toner image from the image forming device onto the recording medium without using an intermediate transfer device.

As shown in FIG. 1, the image forming apparatus 1 includes four image forming devices 20 arranged in a line along a horizontal direction. The four image forming devices 20 include image forming devices 20Y, 20M, 20C, and 20K that exclusively form toner images of colors corresponding to yellow (Y), magenta (M), cyan (C), and black (K), respectively.

Figure 2:
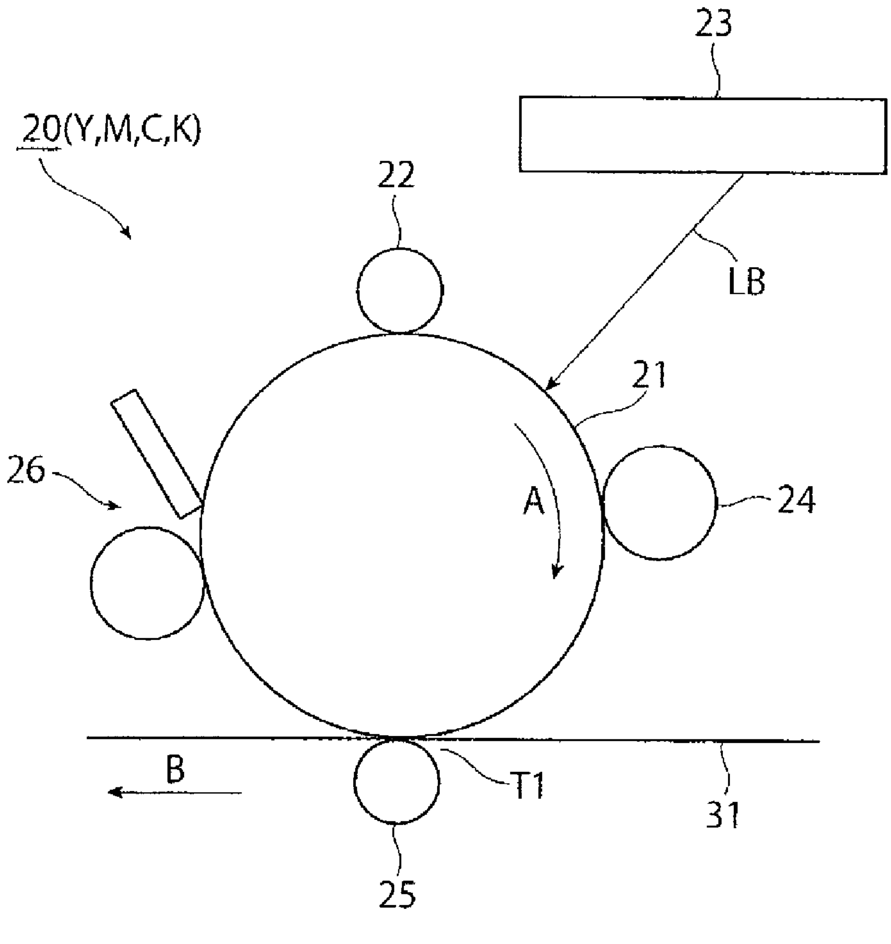
FIG. 2 is a schematic configuration diagram showing an image forming device of the image forming apparatus according to the first exemplary embodiment.

Each image forming device 20 (Y, M, C, K) basically has a similar configuration. As shown in FIG. 2, each image forming device 20 (Y, M, C, K) includes a photoconductor drum 21 as an example of an image carrier that rotates along a direction indicated by an arrow A, a charging device 22 that charges a circumferential surface (image carrying surface) on which an image on the photoconductor drum 21 may be formed to a required potential, an exposure device 23 as an example of an exposure unit that irradiates the charged circumferential surface of the photoconductor drum 21 with light LB based on image information (signal) to form an electrostatic latent image (for each color) having a potential difference, a developing device 24 as an example of a developing unit that develops the electrostatic latent image with the toner as the developer of the corresponding color (Y, M, C, K) to form the toner image, a primary transfer device 25 as an example of a primary transfer unit that transfers each toner image to the intermediate transfer device 30, a drum cleaning device 26, and the like. The drum cleaning device 26 removes and cleans adhering substance such as the toner remaining on the image carrying surface of the photoconductor drum 21 after a primary transfer. A broken line in FIG. 1 indicates a transport path through which the recording sheet 5 is transported inside the image forming apparatus 1.

As shown in FIG. 1, the intermediate transfer device 30 is disposed below the image forming device 20 (Y, M, C, K). The intermediate transfer device 30 includes an intermediate transfer belt 31 as an example of an intermediate transfer unit that circulates and moves in a direction indicated by an arrow B while passing through a primary transfer position T1 positioned below the photoconductor drum 21 of the image forming device 20 (Y, M, C, K). At the primary transfer position T1, the primary transfer device 25 (primary transfer roller) is in contact with the circumferential surface of the photoconductor drum 21 via the intermediate transfer belt 31. A primary transfer bias voltage having a polarity opposite to that of the toner image on the photoconductor drum 21 is applied to the primary transfer device 25 by a high-voltage power source (not shown). The intermediate transfer belt 31 is supported by plural belt support rollers 32 to 34 so as to be able to circulate and move while being held in a desired state from an inner circumference of the intermediate transfer belt 31. The plural belt support rollers 32 to 34 include a belt support roller 32 as a driving roller, a belt support roller 33 as a follower roller that holds a travel position and the like of the intermediate transfer belt 31, and a belt support roller 34 as a backup roller for a secondary transfer.

The sheet transport device 60 that secondarily transfers the toner image on the intermediate transfer belt 31 to the recording sheet 5 is disposed on an outer circumferential surface (image carrying surface) of the intermediate transfer belt 31 supported by the belt support roller 34.

The sheet transport device 60 includes a transfer cylinder 61 that rotates in contact with an outer circumferential surface portion of the intermediate transfer belt 31 supported by the belt support roller 34 at the secondary transfer position T2. The transfer cylinder 61 of the sheet transport device 60 forms a contact secondary transfer device together with the belt support roller 34 that supports the intermediate transfer belt 31 at the secondary transfer position T2.

In the first exemplary embodiment, the transfer cylinder 61 of the sheet transport device 60 is grounded. A required secondary transfer bias voltage having a negative polarity, which is the same polarity as a charging polarity of the toner is supplied to the belt support roller 34 from the high-voltage power source (not shown). A belt cleaning device 35 that removes and cleans adhering substance such as the toner and paper dust remaining on a surface of the intermediate transfer belt 31 is disposed on a downstream side of the intermediate transfer belt 31 that passes through the secondary transfer position T2.

The sheet transport device 60 transports the recording sheet 5 supplied from the sheet feeding device 40 while holding a tip end portion of the recording sheet 5 on an upstream side of the secondary transfer position T2, and also serves as the fixing device that fixes the unfixed toner image transferred on the recording sheet 5. The sheet transport device 60 has a pressurizing cylinder 62 forming a pressurizing unit of the fixing device disposed at an end portion on a downstream side along a transport direction C of the recording sheet 5. A heating roller 51 heated by a heating unit (heat source) 50 is pressed against the pressurizing cylinder 62 so that a surface temperature is held at a predetermined temperature. In the sheet transport device 60, a contact portion in which the heating roller 51 and the pressurizing cylinder 62 contact each other serves as a fixing nip portion in which a required fixing process (heating and pressurizing) is performed. As the fixing device, in addition to a combination of the heating roller 51 and the pressurizing cylinder 62, a flash fixing device or the like that fixes an unfixed toner image on the recording sheet 5 transported by the sheet transport device 60 by radiant heat may be used in an appropriate combination. The sheet transport device 60 will be described in detail later.

The sheet feeding device 40 is disposed at a position below the intermediate transfer device 30. The sheet feeding device 40 includes a single (or plural) sheet accommodating bodies 41 that accommodate the recording sheet 5 of a desired size, type, and the like in a stacked state, a delivery device 42 that sends out the recording sheet 5 one by one from the sheet accommodating body 41, and a sheet feeding transport path 44 that is configured with a single (or plural) sheet transport roller pairs 43 that transport the recording sheet 5 sent out from the delivery device 42 to the secondary transfer position T2 or a transport guiding member (not shown). The sheet transport roller pair 43 disposed at a position immediately before the secondary transfer position T2 in the sheet feeding transport path 44 are configured as, for example, rollers (registration rollers) that adjust a transport timing of the recording sheet 5.

Examples of the recording sheet 5 include plain paper used in a copier, a printer, and the like having an electrophotographic system, thin paper such as tracing paper, and an OHP sheet made of a transparent film-shaped medium made of synthetic resin (PET or the like). In order to further improve smoothness of an image surface after fixing, a surface of the recording sheet 5 may also be as smooth as possible. For example, coated paper in which both front and back surfaces or a surface of the plain paper is coated with a resin or the like, and so-called thick paper having a relatively large basis weight such as art paper for printing may also be used.

A sheet discharge belt 45 for discharging the recording sheet 5 on which the toner image is fixed to a sheet discharge unit (not shown) is disposed on a downstream side of the sheet transport device 60.

A shielding plate 46 made of a metal plate, such as aluminum, is provided between the intermediate transfer device 30 and the sheet transport device 60 to prevent heat of the heating roller 51 from being transmitted to the intermediate transfer device 30 and the image forming device 20 (Y, M, C, K). A material does not have to be metal as long as the material prevents heat transfer.

<Operation of Image Forming Apparatus>

Hereinafter, a basic image forming operation performed by the image forming apparatus 1 will be described.

Here, the image forming operation when forming a full-color image by combining toner images of four colors (Y, M, C, K) using the above-described four image forming devices 20 (Y, M, C, K) will be described.

When the image forming apparatus 1 receives command information of a request for the image forming operation (printing), the four image forming devices 20 (Y, M, C, K), the intermediate transfer device 30, the sheet feeding device 40, the sheet transport device 60, and the like are started.

Then, in each image forming device 20 (Y, M, C, K), as shown in FIG. 2, first, each photoconductor drum 21 rotates in the direction indicated by the arrow A, and each charging device 22 charges the surface of the photoconductor drum 21 to a required polarity (negative polarity in the first exemplary embodiment) and a required potential. Subsequently, the exposure device 23 irradiates the surface of the charged photoconductor drum 21 with light emitted based on an image signal obtained by converting the image information input to the image forming apparatus 1 into each color component (Y, M, C, K), and forms the electrostatic latent image of each color component formed with a required potential difference on the surface of the photoconductor drum 21.

Subsequently, each developing device 24 supplies and electrostatically attaches the toner of the corresponding color (Y, M, C, K) charged to the required polarity (negative polarity) to the electrostatic latent image of each color component formed on the photoconductor drum 21 to perform development. With this development, the electrostatic latent image of each color component formed on each photoconductor drum 21 is developed as the toner image of four colors (Y, M, C, K) developed with the toner of the corresponding color.

Subsequently, when the toner image of each color formed on each photoconductor drum 21 of each image forming device 20 (Y, M, C, K) is transported to the primary transfer position T1, as shown in FIG. 1, the primary transfer device 25 performs the primary transfer in a state in which the toner image of each color is sequentially superimposed on the intermediate transfer belt 31 of the intermediate transfer device 30 rotating in the direction indicated by the arrow B.

In addition, in each image forming device 20 in which the primary transfer is completed, the drum cleaning device 26 scrapes off the adhering substance and cleans the surface of the photoconductor drum 21. Accordingly, each image forming device 20 is in a state of being able to perform a next image forming operation.

Subsequently, in the intermediate transfer device 30, the toner image primarily transferred by the rotation of the intermediate transfer belt 31 is held and transported to the secondary transfer position T2. On the other hand, in the sheet feeding device 40, the required recording sheet 5 is sent out to the sheet feeding transport path 44 in accordance with the image forming operation. In the sheet feeding transport path 44, the sheet transport roller pair 43 serving as the registration rollers send out and supply the recording sheet 5 to the secondary transfer position T2 in accordance with a transfer timing.

At the secondary transfer position T2, the transfer cylinder 61 of the sheet transport device 60 secondarily transfers the toner images on the intermediate transfer belt 31 onto the recording sheet 5 collectively. In the intermediate transfer device 30 in which the secondary transfer is completed, the belt cleaning device 35 removes and cleans the adhering substance such as the toner remaining on the surface of the intermediate transfer belt 31 after the secondary transfer.

Subsequently, the recording sheet 5 to which the toner image is secondarily transferred is separated from the intermediate transfer belt 31, and then is transported to a fixing position facing the heating roller 51 by the sheet transport device 60. In the fixing position, the recording sheet 5 after the secondary transfer is introduced and passed through the fixing nip portion between the rotating heating roller 51 and the rotating pressurizing cylinder 62, so that the necessary fixing process (heating and pressurizing) is performed to fix the unfixed toner image on the recording sheet 5.

After the fixing process is completed, the recording sheet 5 is discharged to a discharge accommodating portion (not shown) by the sheet discharge belt 45.

By performing the above operation, the full-color image formed by combining the toner images formed of four color toners T (Y, M, C, K) is formed on the recording sheet 5. In addition, when a request command for image forming operations for a number of sheets is received, the image forming operation is repeatedly performed in a similar manner for the number of sheets. As described above, in addition to the full-color image, by forming toner images in one to three image forming devices, an image obtained by appropriately combining the toner images of one to three colors is also formed on the recording sheet 5 by a similar image forming operation.

<Configuration of Sheet Transport Device>

Figure 3:
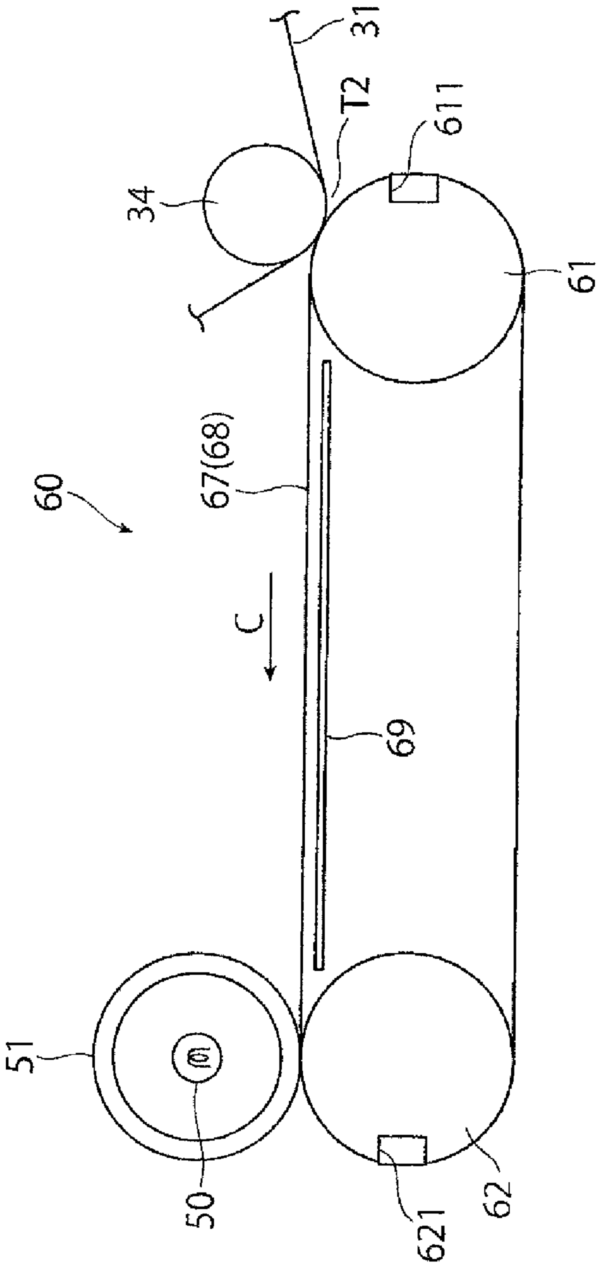
FIG. 3 is a cross-sectional configuration diagram showing the sheet transport device according to the first exemplary embodiment.

As shown in FIG. 3, the sheet transport device 60 according to the first exemplary embodiment holds the tip end portion of the recording sheet 5 and transports the recording sheet 5 in a state of being wound around an outer circumferential surface of the transfer cylinder 61 on the upstream side of the secondary transfer position T2 along the transport direction C of the recording sheet 5, transfers the toner image from the intermediate transfer belt 31 to the recording sheet 5 at the secondary transfer position T2, and also serves as the fixing device that fixes the unfixed toner image on the recording sheet 5 transported by the sheet transport device 60.

Figure 4:
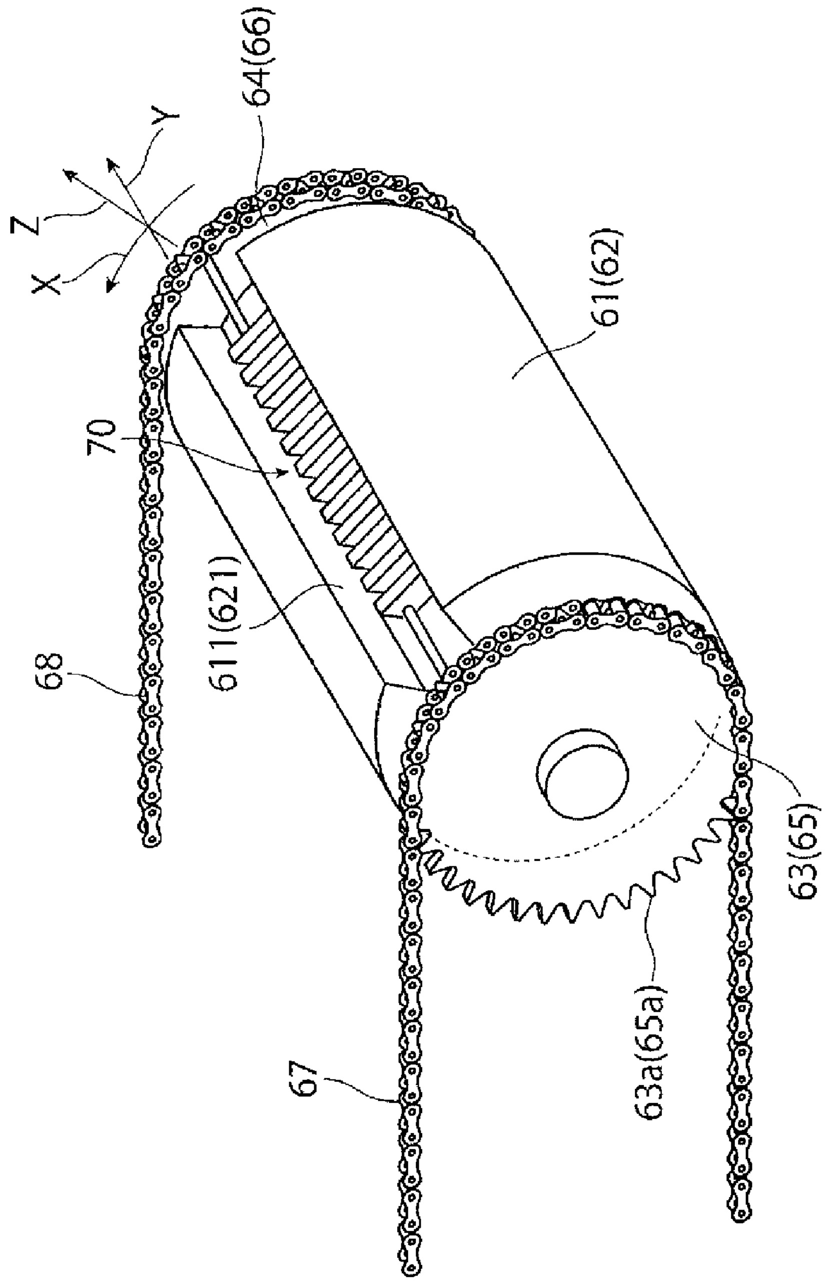
FIG. 4 is a schematic perspective configuration diagram showing a part of the sheet transport device according to the first exemplary embodiment.

As shown in FIGS. 3 and 4, the sheet transport device 60 includes the transfer cylinder 61 as an example of a secondary transfer unit disposed at an end portion on the upstream side along the transport direction C of the recording sheet 5, the pressurizing cylinder 62 as an example of a fixing unit disposed at the end portion on the downstream side along the transport direction C of the recording sheet 5, sprockets 63, 64, 65, 66 as examples of driving units disposed at two end portions of the transfer cylinder 61 and two end portions of the pressurizing cylinder 62 along axial directions of the transfer cylinder 61 and the pressurizing cylinder 62 and rotationally driving the transfer cylinder 61 and the pressurizing cylinder 62, two chains 67, 68 respectively wound between the sprockets 63, 64 disposed at the two end portions of the transfer cylinder 61 and between the sprockets 65, 66 disposed at the two end portions of the pressurizing cylinder 62, and a chain gripper 70 as an example of a holding unit stretched between the two chains 67, 68 and holding the tip end portion of the recording sheet 5. In FIG. 3, reference sign 69 denotes a support plate that supports a back surface of the recording sheet 5 transported by the sheet transport device 60. In FIG. 4, reference signs of the pressurizing cylinder 62 configured similarly as the transfer cylinder 61 and the sprockets 65, 66 disposed at the two end portions of the pressurizing cylinder 62 are collectively shown.

Figure 5:
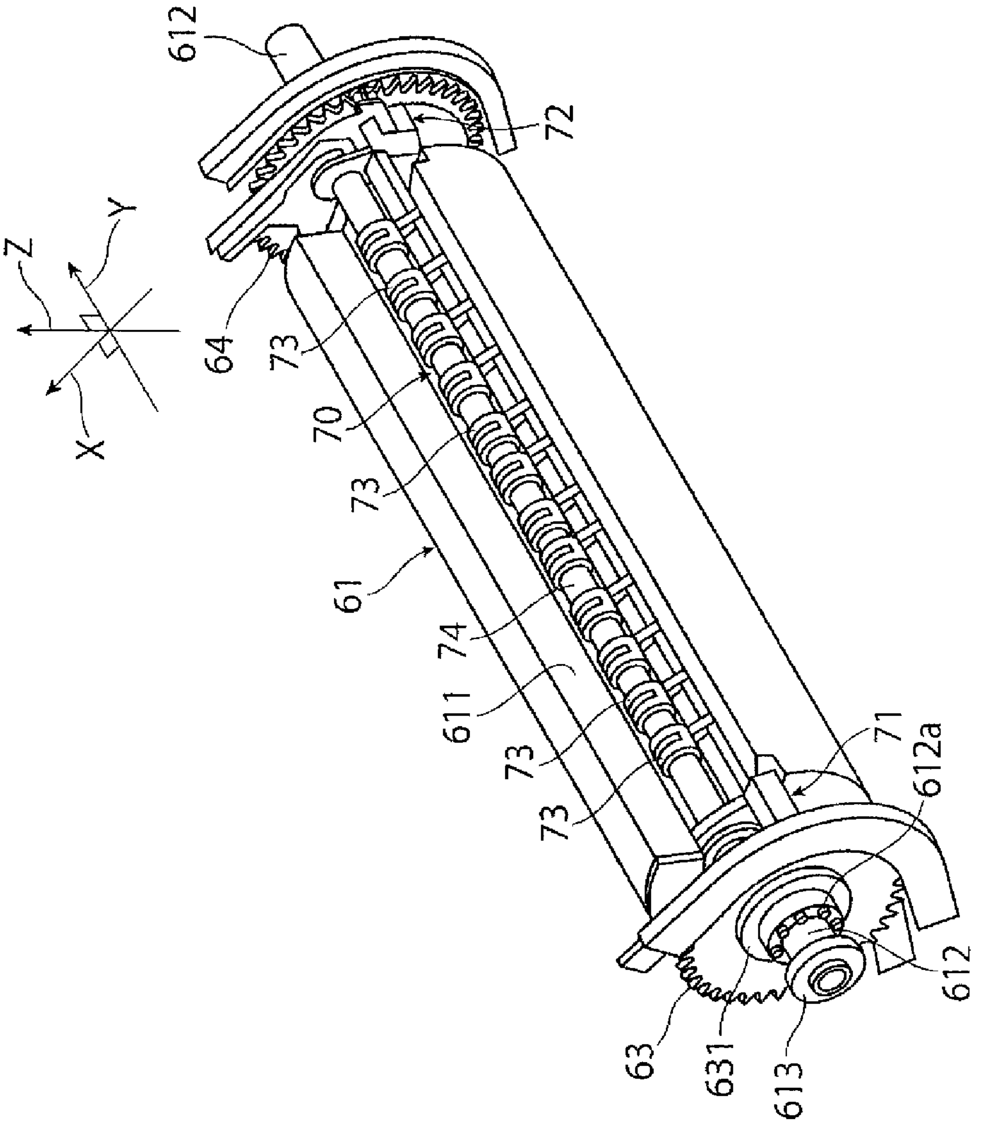
FIG. 5 is a perspective configuration diagram showing a transfer cylinder of the sheet transport device according to the first exemplary embodiment.

As shown in FIG. 5, the transfer cylinder 61 is formed in a substantially cylindrical shape by synthetic resin, metal, or the like having conductivity imparted to the outer circumferential surface. The transfer cylinder 61 is connected to a ground (not shown) (grounded). The transfer cylinder 61 is provided with a recessed portion 611 having an outer circumferential surface opened at a part in a circumferential direction of the transfer cylinder 61 is provided over an entire length along the axial direction. The chain gripper 70 that holds the tip end portion of the recording sheet 5 along the transport direction C in synchronization with rotation of the sprockets 63, 64 is accommodated in the recessed portion 611 of the transfer cylinder 61. In other words, the recessed portion 611 of the transfer cylinder 61 may also be said to be an accommodating portion in which the chain gripper 70 is accommodated. The transfer cylinder 61 is a member that contacts the intermediate transfer belt 31 supported by the belt support roller 34, and the chain gripper 70 accommodated in the recessed portion 611 does not protrude from the outer circumferential surface of the transfer cylinder 61. However, since holding of the recording sheet 5 by the chain gripper 70 is performed on the upstream side of the secondary transfer position T2, there is no problem even when a part of the chain gripper 70 protrudes from the outer circumferential surface of the transfer cylinder 61 in a holding operation of the recording sheet 5.

The recessed portion 611 of the transfer cylinder 61 is not limited to one position along the circumferential direction, and may be provided, for example, at plural (two or more) positions different by 180 degrees along the circumferential direction. As shown in FIG. 3, the pressurizing cylinder 62 is provided with a recessed portion 621 similarly as the recessed portion 611 of the transfer cylinder 61. In the illustrated example, the recessed portion 621 of the pressurizing cylinder 62 is disposed at a position phase-shifted by 180 degrees from the recessed portion 611 of the transfer cylinder 61 so that the recessed portion 621 has a symmetrical positional relationship with the recessed portion 611.

Figure 6:
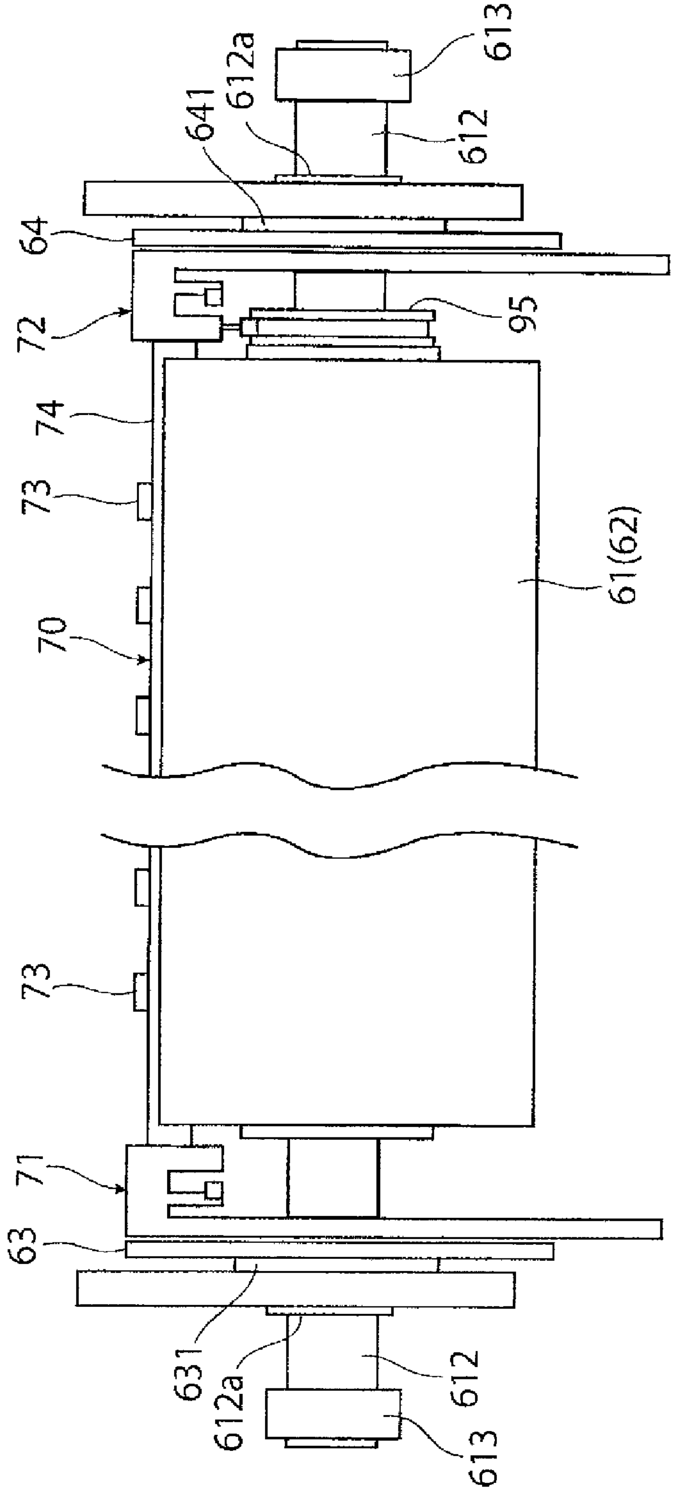
FIG. 6 is a side configuration diagram showing the transfer cylinder of the sheet transport device according to the first exemplary embodiment.

As shown in FIGS. 5 and 6, the transfer cylinder 61 is provided with rotating shafts 612 fixed to the two end portions along the axial direction of the transfer cylinder 61. The rotating shaft 612 of the transfer cylinder 61 is rotatably supported by a frame (not shown) of the sheet transport device 60 via a bearing member 613. The sprockets 63, 64 are mounted on the rotating shafts 612 of the transfer cylinder 61. The sprockets 63, 64 are fixed to flange portions **612*a* of the rotating shafts 612 via bosses 631, 641 provided on one surface of the sprockets 63, 64** with screws or the like.

The transfer cylinder 61 is rotationally driven by the rotating shaft 612 at a required rotation speed by a driving force transmitting unit including a drive source such as a driving motor (not shown) and a gear (not shown). A rotational driving force of the transfer cylinder 61 is transmitted to the pressurizing cylinder 62 via the sprockets 63, 64, 65, 66 and the chains 67, 68, and the pressurizing cylinder 62 is rotationally driven. It is to be noted that the present disclosure is not limited to a case where the transfer cylinder 61 is rotationally driven, and the pressurizing cylinder 62 may be configured to be rotationally driven by a drive source such as a driving motor.

The pressurizing cylinder 62 is basically configured similarly as the transfer cylinder 61. However, the pressurizing cylinder 62 has a function as a pressurizing unit of the fixing device. Therefore, the pressurizing cylinder 62 may have an elastic body layer made of a heat resistant elastic body such as silicone rubber or fluororubber, or a release layer made of the elastic body layer, polytetrafluoroethylene (PTFE), perfluoroalkoxy alkane (PFA) or the like on an outer circumferential surface of the pressurizing cylinder 62.

As shown in FIG. 4, two chains 67, 68 are stretched between the sprockets 63, 64 disposed at the two end portions along the axial direction of the transfer cylinder 61 and the sprockets 65, 66 disposed at the two end portions along the axial direction of the pressurizing cylinder 62. In FIGS. 5 and 6, the chains 67, 68 are not shown.

Figure 7:
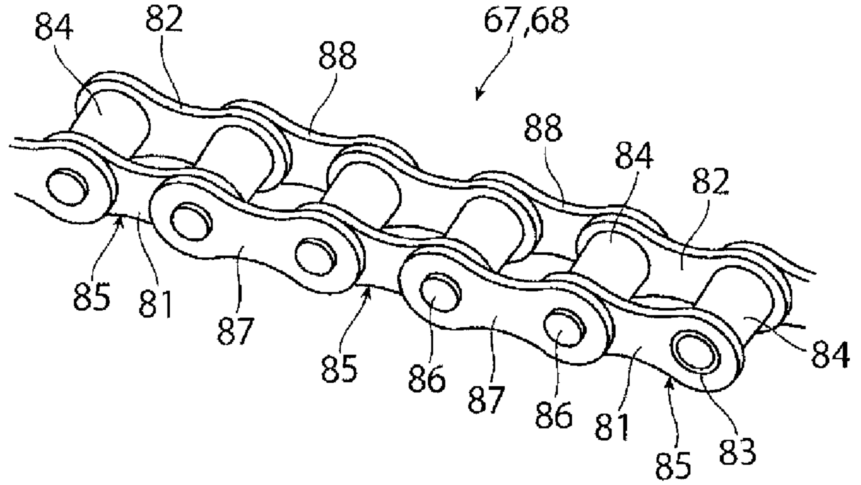
FIG. 7 is a perspective configuration diagram of a chain.

As shown in FIG. 7, the chains 67, 68 are roller chains provided with a chain component 85 in which two rollers 84 rotatably supported by a bush 83 are disposed at two end portions along a longitudinal direction between a pair of inner plates 81, 82 parallel to each other along a width direction that is a direction intersecting a moving direction. The chains 67, 68 are formed in an endless shape that may be bent about a pin 86 by sequentially connecting adjacent chain components 85 with the pin 86 inserted through the bush 83 and a pair of outer plates 87, 88 for fixing end portions of the pin 86 to a retained state. The chains 67, 68 are rotationally driven by teeth **63*a*, 64*a*, 65*a*, 66*a* (see FIGS. 4 and 8) of the sprockets 63, 64, 65, 66 meshing between the adjacent rollers 84**.

Figure 8:
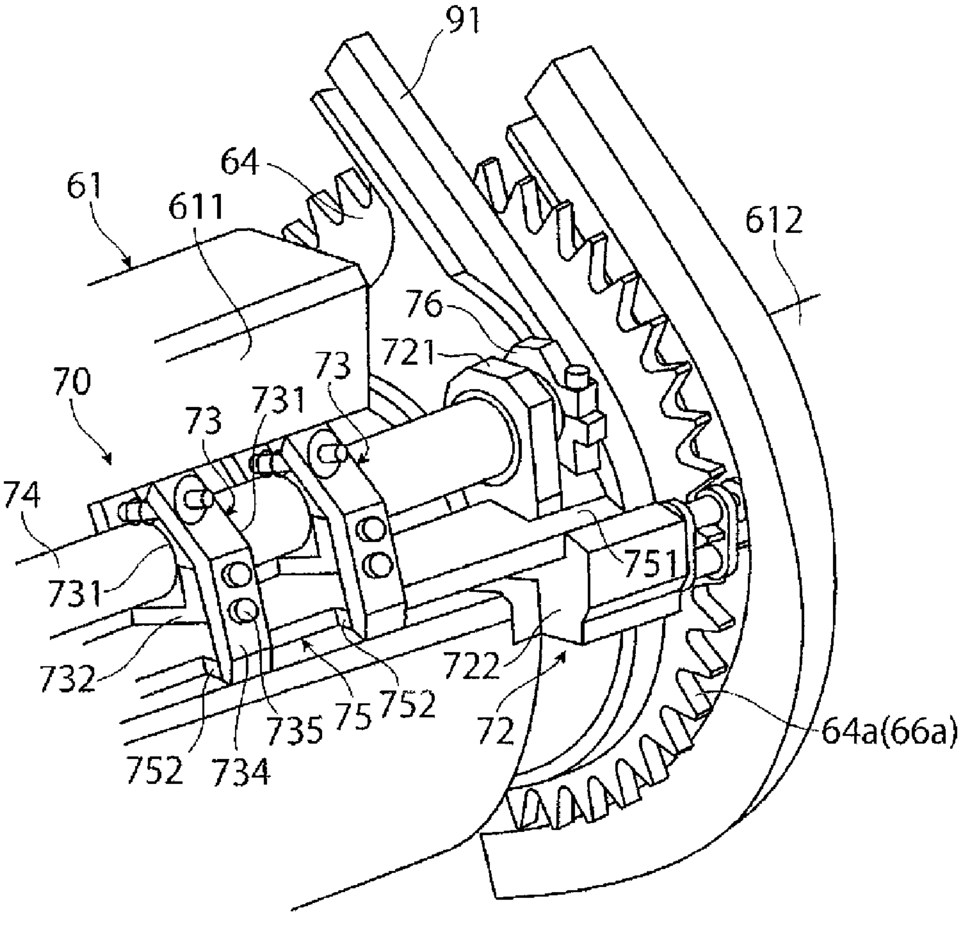
FIG. 8 is an enlarged perspective view showing parts of the transfer cylinder.

As shown in FIGS. 5 and 8, the chain gripper 70 is mounted on the chains 67, 68 via a pair of mounting members (holder members) 71, 72 respectively disposed at two end portions along a longitudinal direction of the chain gripper 70. The mounting members 71, 72 are members for mounting the chain gripper 70 on the chains 67, 68, and are also members for holding the chain gripper 70 mounted on the chains 67, 68. The number of chain grippers 70 is appropriately set according to lengths of the chains 67, 68 that circulate and move, a length of the recording sheet 5 to be transported, and the like.

The number of the chain grippers 70 mounted on the chains 67, 68 is optional and is not particularly limited. Considering transportability and the like of the recording sheet 5 in the sheet transport device 60, plural chain grippers 70 may be provided.

In the first exemplary embodiment, the number of the chain grippers 70 mounted on the chains 67, 68 is set to two in total, each of which corresponds to the recessed portion 611 of the transfer cylinder 61 and the recessed portion 621 of the pressurizing cylinder 62. However, three or more chain grippers 70 may be provided. The lengths of the chains 67, 68 are set to, for example, an integral multiple of an outer circumferential length of the sprockets 63, 64, 65, 66.

Figure 9A:
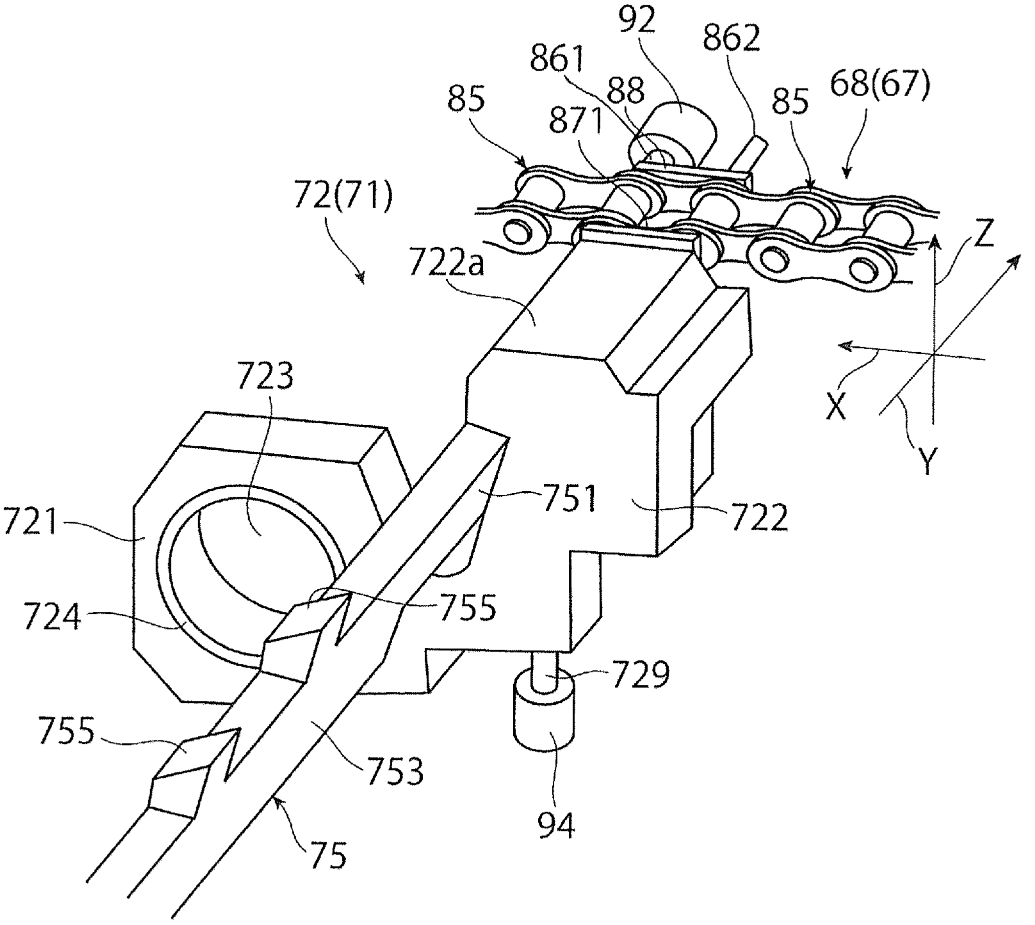
FIGS. 9A and 9B are configuration diagrams showing a mounting member.
Figure 9B:
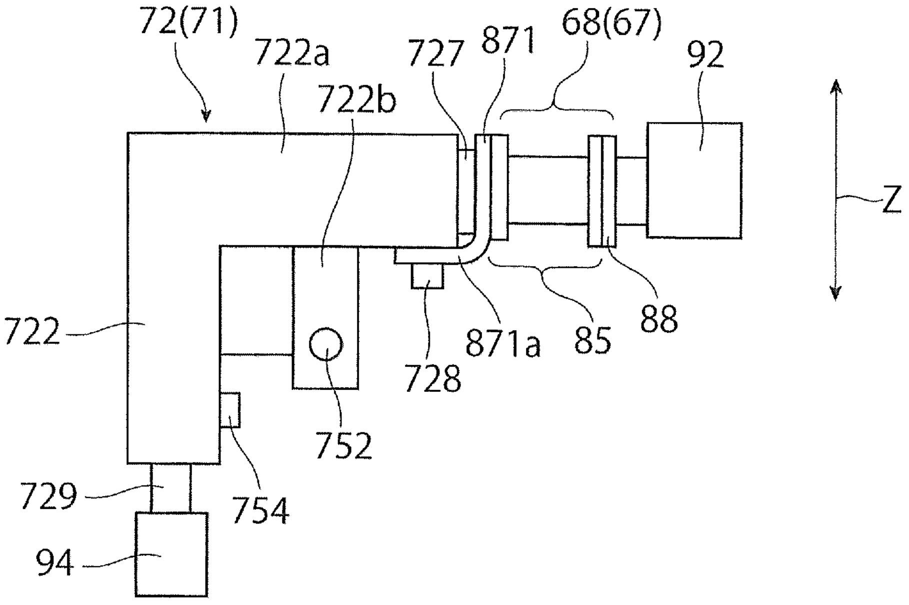

As shown in FIGS. 9A and 9B, the mounting members 71, 72 of the chain gripper 70 are made of a metal such as stainless steel, synthetic resin, or the like to form a block body having a substantially rectangular front surface and a substantially L-shaped side surface. The mounting members 71, 72 are configured in a similar manner. Here, one mounting member 72 will be described.

As shown in FIG. 8, the mounting member 72 includes a support portion 721 that rotatably supports two end portions of a claw drive shaft 74 for rotationally driving a claw member 73 of the chain gripper 70, and a fixing portion 722 that fixes two end portions of a claw receiving member 75 along the longitudinal direction that holds the recording sheet 5 with a tip end of the claw member 73 of the chain gripper 70 in contact with the claw receiving member 75.

The recording sheet 5 held by the chain gripper 70 is fed from the upstream side along a rotation direction of the transfer cylinder 61. Therefore, the claw member 73 of the chain gripper 70 is disposed on the downstream side along the transport direction of the recording sheet 5 relative to the claw receiving member 75 holding the recording sheet 5.

Figure 10:
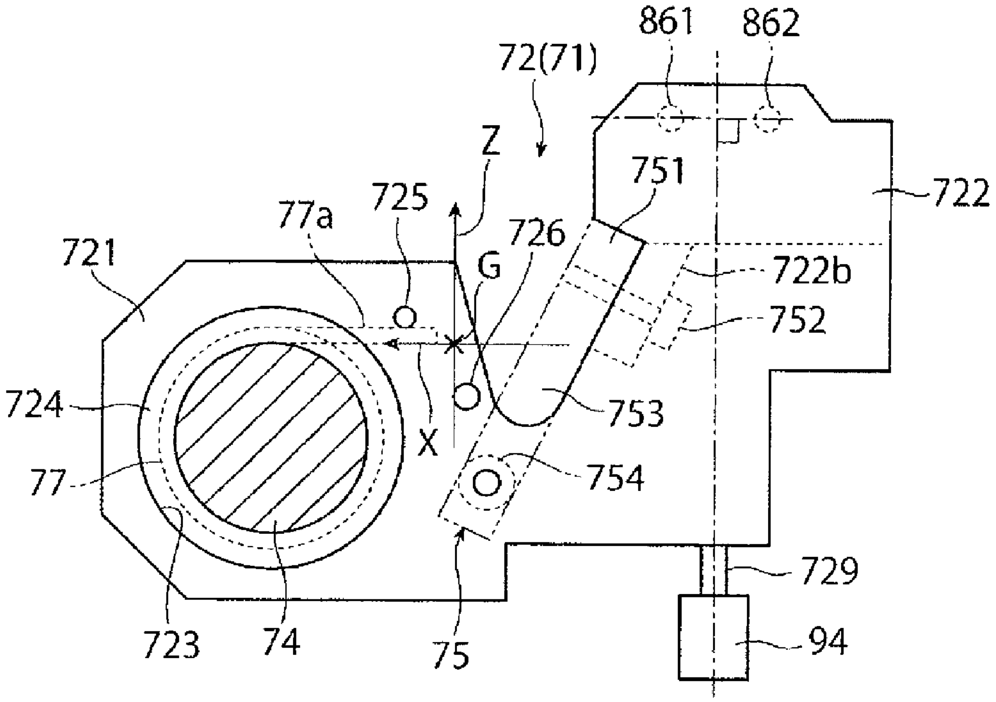
FIG. 10 is a front view showing the mounting member.

As shown in FIG. 10, the support portion 721 of the mounting member 72 is formed in a flat plate shape having a substantially rectangular front surface. The support portion 721 of the mounting member 72 has a support hole 723 for rotatably supporting the claw drive shaft 74. The claw drive shaft 74 is rotatably supported in the support hole 723 of the support portion 721 via an annular bearing member 724 made of synthetic resin or the like. The support portion 721 of the mounting member 72 is not limited to a flat plate shape having a substantially rectangular front surface, and may be formed in a cylindrical shape or the like as long as the claw drive shaft 74 may be rotatably supported.

Figure 11:
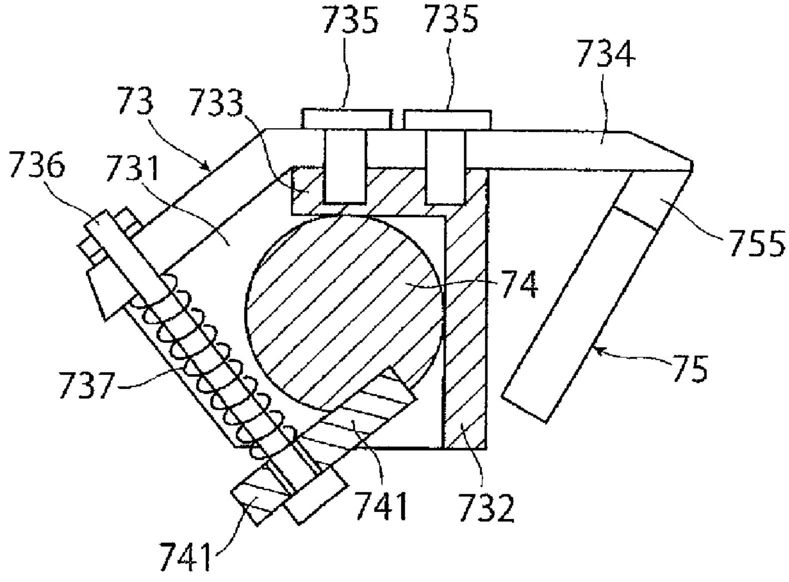
FIG. 11 is a cross-sectional configuration diagram showing a claw member.

As shown in FIG. 5, the claw drive shaft 74 is formed of, for example, a metal such as stainless steel or brass in a columnar shape longer than a length of the transfer cylinder 61 along the axial direction. Plural (twelve in the illustrated example) claw members 73 are mounted on the claw drive shaft 74 at required intervals along the axial direction. As shown in FIG. 11, the claw drive shaft 74 has a fixing portion 741 that is fixed in a flat plate shape on an outer circumference of the claw drive shaft 74 on a side opposite to a mounting position of the claw member 73.

As shown in FIGS. 8 and 11, the claw member 73 includes shaft fixing portions 731 that are rotatably inserted into the fixing portion 741 of the claw drive shaft 74 and are disposed at a required distance along the axial direction, and plate-shaped connecting portions 732 that are integrally connected to the shaft fixing portions 731. A claw fixing portion 733, which is formed in a short flat plate shape outward in a tangential direction of the claw drive shaft 74, is integrally provided at an upper end of the connecting portion 732. On a surface of the claw fixing portion 733, a claw plate 734 formed of metal, synthetic resin, or the like is fixed with a screw 735. A position of a rear end portion of the claw plate 734 is restricted along a circumferential direction of the claw drive shaft 74 by a long fixing screw 736 inserted and fixed to the fixing portion 741 of the claw drive shaft 74, and is biased in a clockwise direction by a coil spring 737 inserted into the fixing screw 736 in a compressed state. A tip end of the claw plate 734 protrudes from an end portion of the claw fixing portion 733 with a required length.

Figure 12:
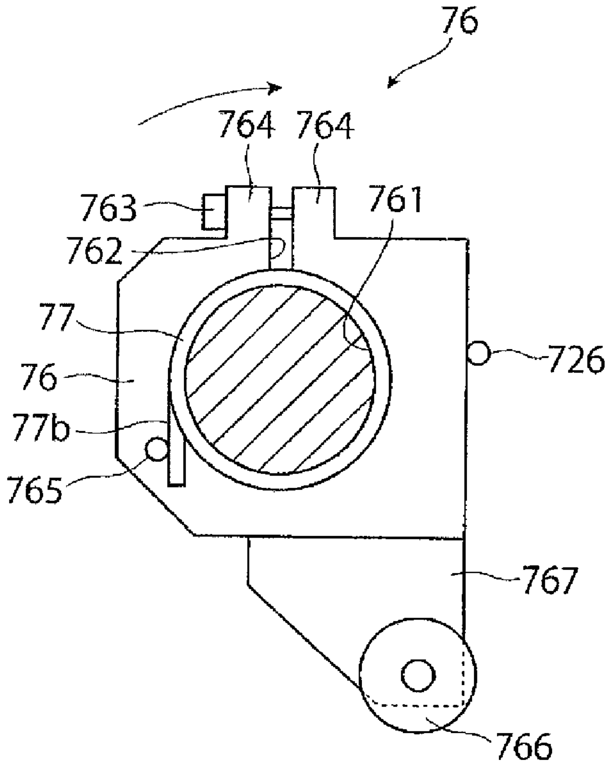
FIG. 12 is a cross-sectional configuration diagram showing an operating member.

As shown in FIG. 8, at two end portions of the claw drive shaft 74 along the axial direction, an operating member 76 for holding and releasing the recording sheet 5 by the claw member 73 by rotating the claw drive shaft 74 at a required timing is provided in a fixed state. As shown in FIG. 12, the operating member 76 has a circular opening 761 through which the end portion of the claw drive shaft 74 is inserted. An upper end portion of the opening 761 of the operating member 76 is divided into two by a slit-shaped cutout portion 762 along a radial direction. A flange portion 764 for tightening the claw drive shaft 74 with a screw 763 in a state of being inserted along the cutout portion 762 is provided at an outer side end of the cutout portion 762.

As shown in FIGS. 10 and 12, a coil spring 77, which is an example of a biasing member that applies a biasing force that rotates the claw drive shaft 74 in the clockwise direction, is wound around the outer circumference of the claw drive shaft 74 between the support portion 721 of the mounting member 72 and the operating member 76. One end 77*a* of the coil spring 77 is locked to a pin 725 planted in an outer side surface of the support portion 721 of the mounting member 72. The other end 77*b* of the coil spring 77 is locked to a pin 765 planted on an inner side surface of the operating member 76. As a result, the biasing force that rotates the claw drive shaft 74 in the clockwise direction in FIG. 12 is constantly applied to the claw drive shaft 74 by the coil spring 77. The support portion 721 of the mounting member 72 is provided with a thin rod-shaped stopper 726 that restricts rotation of the operating member 76 in the clockwise direction so as to protrude toward the operating member 76. As shown in FIG. 11, the claw member 73 mounted on the claw drive shaft 74 is pressed against the claw receiving member 75 by the biasing force of the coil spring 77, so that a holding force for hold the tip end portion of the recording sheet 5 in a gripped state is applied to the claw member 73. The stopper 726 does not necessarily have to have a thin rob shape as long as the stopper 726 restricts the rotation of the operating member 76 in the clockwise direction.

Figure 13:
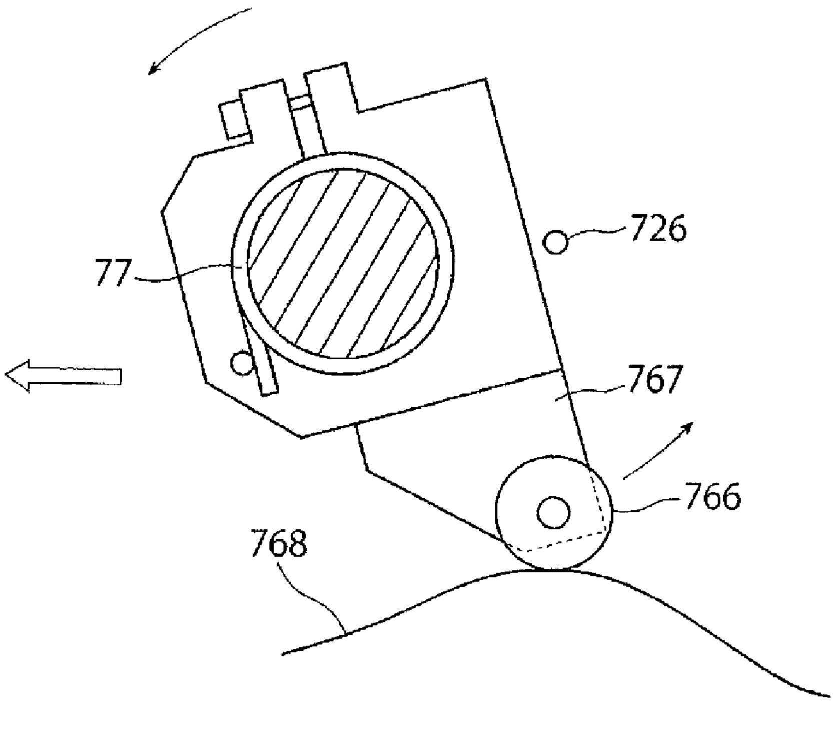
FIG. 13 is a cross-sectional configuration diagram showing an operation of the operating member.

As shown in FIG. 12, the operating member 76 is provided with a cam follower 766 for rotating the operating member 76 to a holding position and a release position of the recording sheet 5. The cam follower 766 has a roller rotatably mounted on an arm portion 767 provided at a lower end portion of the operating member 76 so as to protrude downward. As shown in FIG. 13, the cam follower 766 comes into contact with a cam member 768 provided in a state of being fixed to the sheet transport device 60 as the chain gripper 70 moves, so that the operating member 76 is rotated at a predetermined timing and with a predetermined angle to hold and release the recording sheet 5.

Figure 14A:
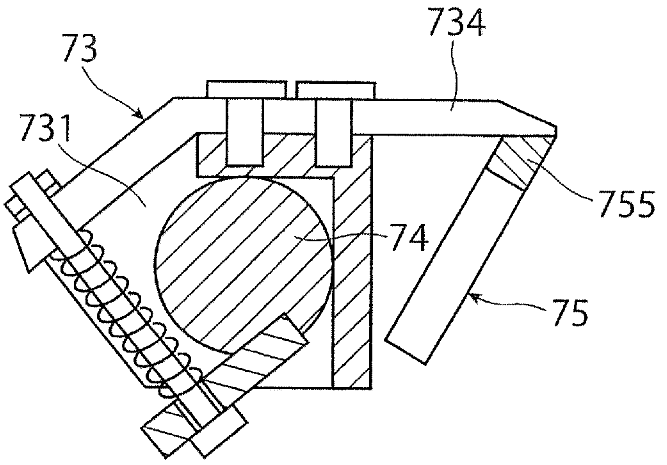
FIGS. 14A, 14B and 14C are cross-sectional configuration diagrams showing operations of the operating member.
Figure 14B:
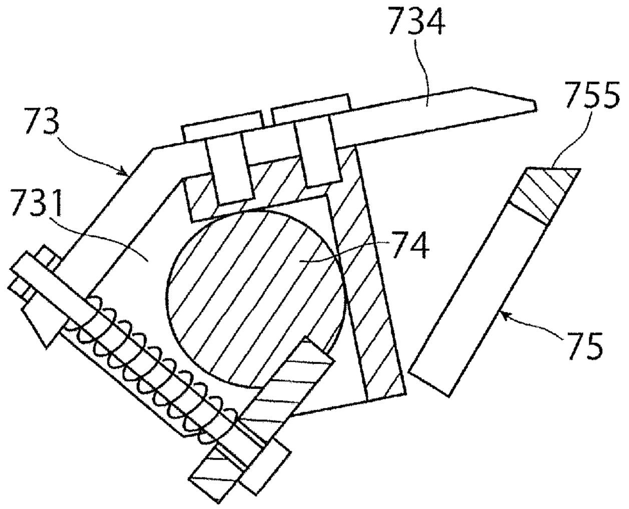
Figure 14C:
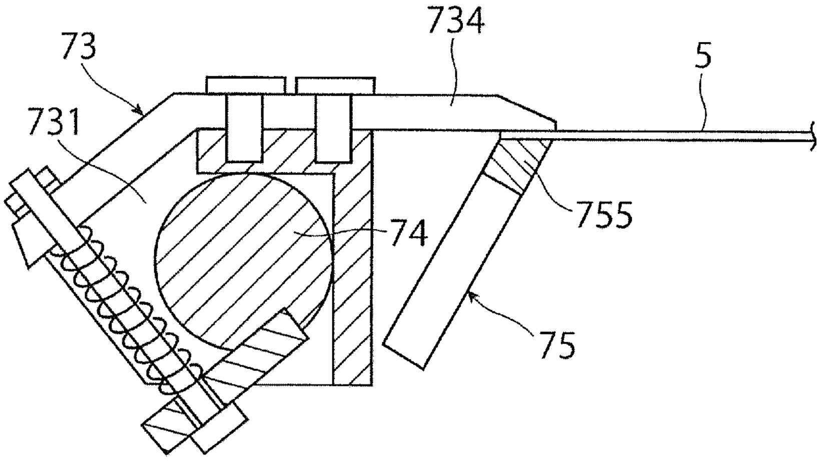
Figure 15A:
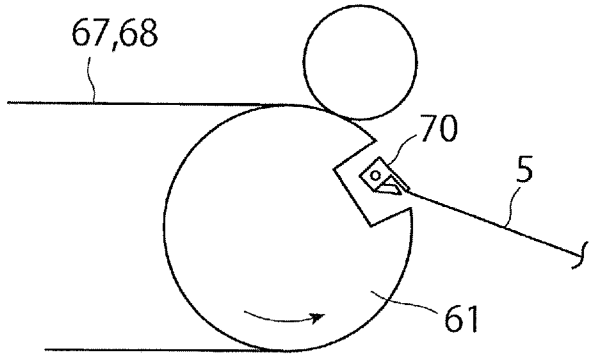
FIGS. 15A, 15B, 15C and 15D are diagrams showing operations of a chain gripper.
Figure 15B:
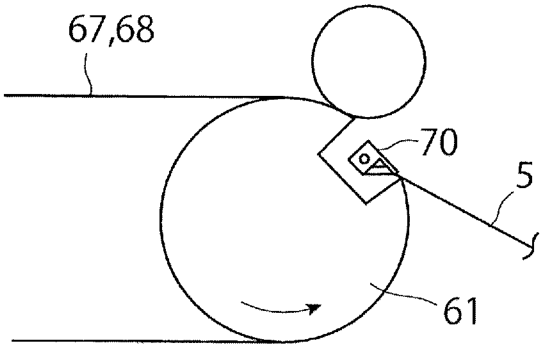
Figure 15C:
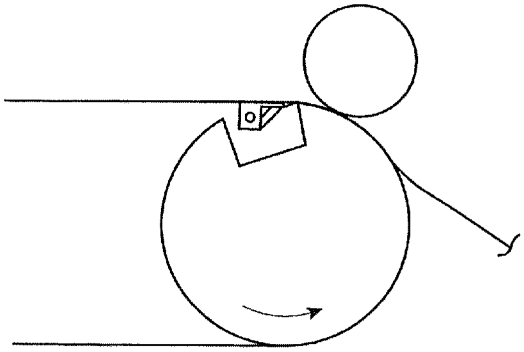
Figure 15D:
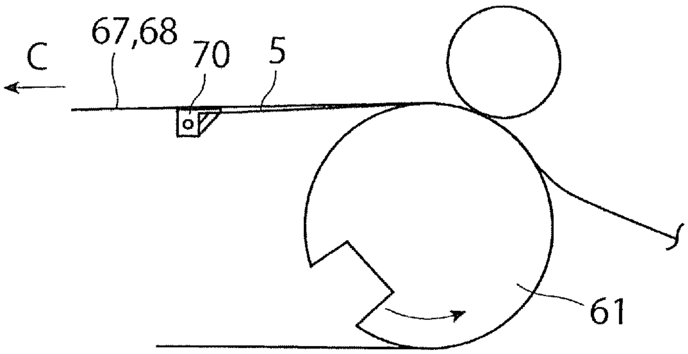

As shown in FIG. 1, the recording sheet 5 is fed to the chain gripper 70 of the transfer cylinder 61 by the sheet feeding device 40 at a sheet feeding position on the upstream side of the secondary transfer position T2 along the rotation direction of the transfer cylinder 61. As shown in FIGS. 14A, 14B and 14C, the claw member 73 is opened and closed with respect to the claw receiving member 75 at a required timing, and the chain gripper 70 holds the recording sheet 5 in a state in which the tip end portion of the recording sheet 5 is gripped.

As shown in FIGS. 15A, 15B, 15C and 15D, the recording sheet 5 held in a state where the tip end portion is held in the chain gripper 70 is wound around the outer circumferential surface of the transfer cylinder 61 in accordance with rotation of the transfer cylinder 61. Thereafter, after the toner image is secondarily transferred from the intermediate transfer belt 31, the recording sheet 5 is separated from the intermediate transfer belt 31 in accordance with the rotation of the transfer cylinder 61 at the secondary transfer position T2, and is transported to the pressurizing cylinder 62 along the transport direction C by the chain gripper 70 that moves along with the chains 67, 68.

On the other hand, as shown in FIGS. 9A, 9B, and 10, the fixing portion 722 of the mounting member 72 is formed in a flat plate shape integrally with the support portion 721 via a substantially V-shaped groove portion on one side of the support portion 721, and an upper end portion positioned upward than the support portion 721 forms a horizontal plate portion 722*a* having a substantially L-shaped side surface along the horizontal direction outward along the axial direction of the claw drive shaft 74.

Two end portions 751 along the longitudinal direction of the claw receiving member 75 are fixed to the fixing portion 722 of the mounting member 72. The claw receiving member 75 is formed in a flat plate shape having a required thickness. In addition, a width of the two end portions 751 of the claw receiving member 75 is narrow. The two end portions 751 of the claw receiving member 75 are disposed in a state of being inclined along the fixing portion 722 of the mounting member 72, and are fixed with a screw 752 from a back surface to a support portion 722*b* (see FIG. 10) inclined so as to protrude downward from the horizontal plate portion 722*a* of the fixing portion 722. As shown in FIG. 9B, in a body 753 in which a width of the claw receiving member 75 is wide, an end surface along the longitudinal direction of the body 753 is fixed to the support portion 721 of the mounting member 72 with a screw 754. In an upper end portion of the claw receiving member 75, plural convex receiving portions 755 against which tip ends of the claw member 73 are pressed are provided at the same intervals as an arrangement of the claw member 73.

As shown in FIGS. 9A and 9B, the fixing portion 722 of the mounting member 72 is disposed such that the horizontal plate portion 722*a* of the fixing portion 722 extends outward along the axial direction of the claw drive shaft 74. As shown by a broken line in FIG. 10, two extension pins 861, 862 longer than the normal pin 86 of the chains 67, 68 are fixed to an end portion on an outer side of the horizontal plate portion 722*a* of the fixing portion 722 along the longitudinal direction by fastening or the like via a male screw portion formed on an outer circumferential surface. As shown in FIGS. 9A and 9B, an outer plate 871 for mounting the chains 67, 68 are inserted through the two extension pins 861, 862 via the stopper 726. The outer plate 871 for mounting is formed in an L-shaped cross section. As shown in FIG. 9B, in the outer plate 871 for mounting, a horizontal plate portion 871*a* folded in the horizontal direction is fixed with a screw 728 to a tip end on a lower surface of the fixing portion 722 of the mounting member 72.

The chain component 85 of the chains 67, 68 is inserted through the two extension pins 861, 862. At an intermediate position between the two extension pins 861, 862, the other outer plate 88 of the chains 67, 68 is inserted in a retained state.

Thus, the fixing portion 722 of the mounting member 72 is fixed to the chains 67, 68 via the two extension pins 861, 862 and the outer plate 871 for mounting. As a result, the chain gripper 70 circulates and moves together with the chains 67, 68 via the left and right mounting members 71, 72.

In the sheet transport device 60, as shown in FIG. 4, the chain gripper 70 circulates and moves with rotation of the sprockets 63, 64, 65, 66 via the chains 67, 68. At this time, since a posture of the chain gripper 70 is fixed to the chains 67, 68 via the two extension pins 861, 862, the posture of the chain gripper 70 changes depending on a moving state of the chains 67, 68. As shown in FIG. 7, the chains 67, 68 are configured by sequentially connecting the adjacent chain components 85 with the pin 86 inserted through the bush 83 and the pair of outer plates 87, 88 for fixing the end portions of the pin 86.

The chains 67, 68 has gaps (clearance) between the inner plates 81, 82 and the outer plates 87, 88, gaps between the pin 86 and the inner plates 81, 82 and the outer plates 87, 88, a gap between the bush 83 and the roller 84, a gap between the pin 86 and the bush 83, and the like. Therefore, when the chains 67, 68 mesh with the teeth 63*a*, 64*a* of the sprockets 63, 64 along an outer circumference of the transfer cylinder 61 and move, the chains 67, 68 do not move accurately along a circular trajectory that is an outer circumferential shape of the sprockets 63, 64, and displacement such as partial inclination along a radial direction or the like of the sprockets 63, 64 may occur.

Thus, when the chains 67, 68 are displaced in the radial direction or the like of the sprockets 63, 64, the chain gripper 70 mounted on the chains 67, 68 is also displaced in a similar manner. Therefore, in the sheet transport device 60, when the chain gripper 70 is displaced along the radial direction of the sprockets 63, 64, such as when the tip end portion of the recording sheet 5 is held by the chain gripper 70 or when the recording sheet 5 is transported by the chain gripper 70, a deviation or inclination of the holding position of the tip end portion of the recording sheet 5 by the chain gripper 70, a positional deviation or inclination along the transport direction of the recording sheet 5 or the radial direction of the sprockets 63, 64, and the like may occur, and a transfer failure such as a registration deviation or a skew may occur in the toner image (image) transferred onto the recording sheet 5 at the secondary transfer position T2.

Therefore, in the sheet transport device 60 according to the first exemplary embodiment, a first positioning portion is included that positions the chain gripper 70 on both sides along a direction Z intersecting both a transport direction X of the recording sheet 5 and a width direction Y of the recording sheet 5 while the chains 67, 68 move along the sprockets 63, 64. Here, the width direction of the recording sheet 5 refers to a direction in which the claw members 73 of the chain gripper 70 are arranged.

That is, in the sheet transport device 60 according to the first exemplary embodiment, as shown in FIG. 4, while the chains 67, 68 move along the sprockets 63, 64, the moving direction of the chain gripper 70, that is, the transport direction X of the recording sheet 5 is a direction along the outer circumferential shape of the sprockets 63, 64. In addition, the width direction Y of the recording sheet 5 is a direction in which the claw members 73 of the chain gripper 70 are arranged, and is literally a direction along a width of the recording sheet 5. Then, in the first exemplary embodiment, the direction Z intersecting both the transport direction X of the recording sheet 5 and the width direction Y of the recording sheet 5 means the radial direction of the sprockets 63, 64.

Figure 16:
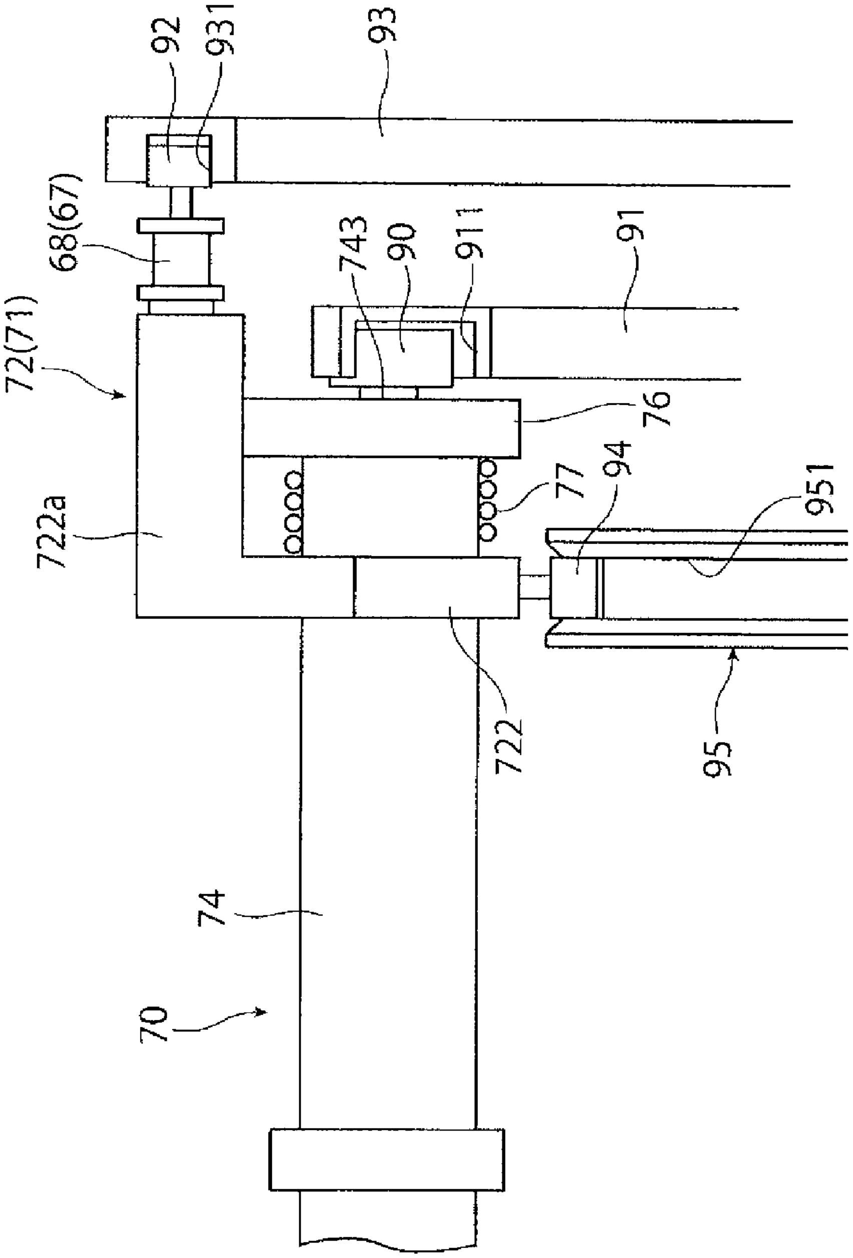
FIG. 16 is a side configuration diagram showing parts of the sheet transport device according to the first exemplary embodiment.

In the sheet transport device 60 according to the first exemplary embodiment, as shown in FIG. 16, first guide rollers 90, which are examples of the first positioning portion, are rotatably mounted on two end portions of the recording sheet 5 along the width direction Y that is the axial direction of the claw drive shaft 74 of the chain gripper 70 held by the mounting members 71, 72. The two end portions of the claw drive shaft 74 of the chain gripper 70 are extended to an outside of the operating member 76 along the axial direction of the claw drive shaft 74. Rotating shafts 743 for rotatably mounting the first guide roller 90 are integrally provided at the extended two end portions of the claw drive shaft 74. The cylindrical first guide roller 90 having a required outer diameter is rotatably mounted on and retained in the rotating shaft 743. In addition, a position of the first guide roller 90 along the axial direction of the claw drive shaft 74 is restricted. The outer diameter of the first guide roller 90 is set to be smaller than an outer diameter of the claw drive shaft 74.

The claw drive shaft 74 on which the first guide roller 90 as an example of the first positioning portion is mounted is a member on which the claw member 73 is directly mounted. Therefore, by providing the first guide roller 90 on the claw drive shaft 74, a position of the claw member 73 mounted on the claw drive shaft 74 is directly restricted.

The first guide roller 90 as an example of the first positioning portion may also be provided on a portion other than the claw drive shaft 74. However, the claw drive shaft 74 is literally a shaft-shaped member. Therefore, by providing the first guide roller 90 at the end portion of the claw drive shaft 74 along the axial direction, the first guide roller 90 may be easily mounted, and position accuracy of the first guide roller 90 may be easily ensured.

As shown in FIGS. 8 and 16, the sheet transport device 60 is provided with a first guide member 91 as an example of a first guide unit that guides the first guide rollers 90 on the claw drive shaft 74. The first guide member 91 is formed of synthetic resin, metal, or the like in a substantially arc shape having a required thickness. As shown in FIG. 6, first guide members 91 are provided in a state of being fixed to the sheet transport device 60 at positions corresponding to the two end portions of the transfer cylinder 61 in the axial direction.

Figure 17:
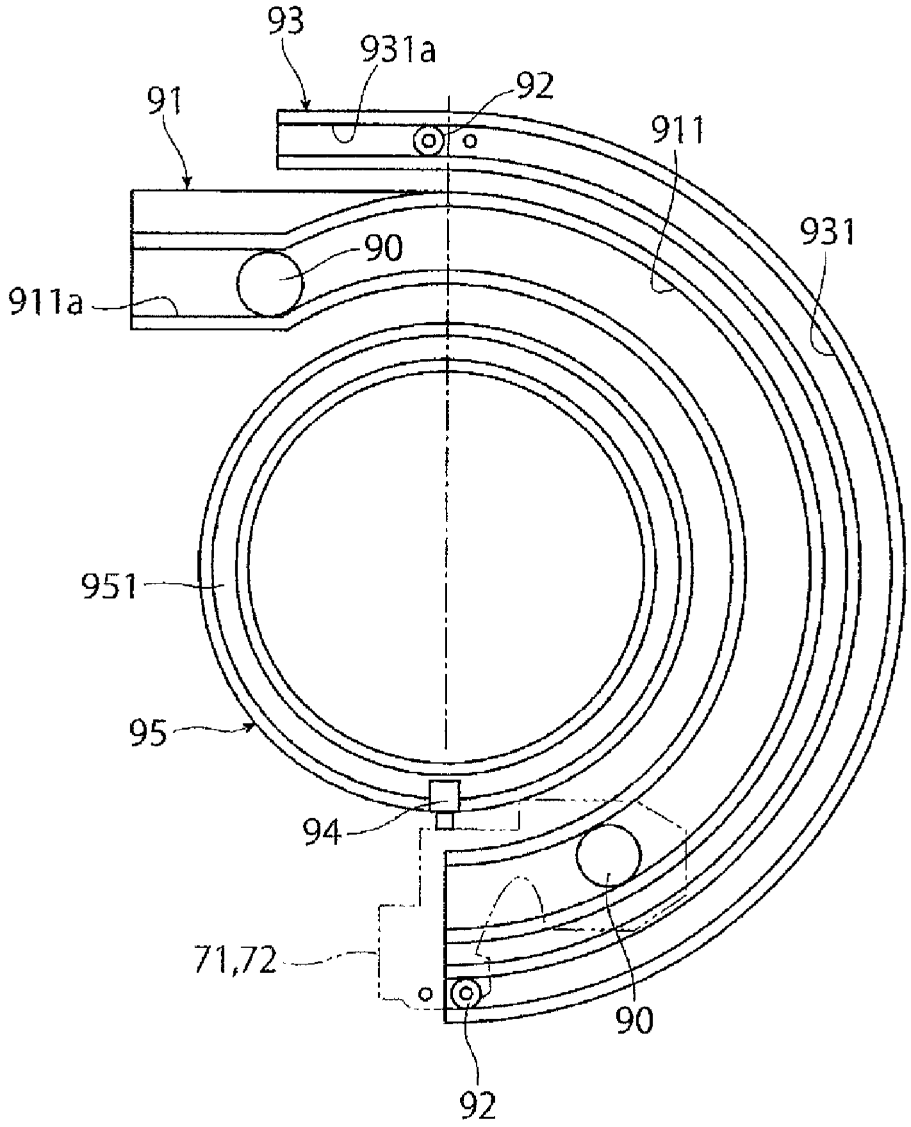
FIG. 17 is a cross-sectional configuration diagram showing the parts of the sheet transport device according to the first exemplary embodiment.

As shown in FIGS. 16 and 17, a first guide groove 911 having an angular U-shaped cross section as an example of a first guide groove that rotatably guides the first guide roller 90 is formed in an inner side surface of the first guide member 91. The first guide groove 911 is not limited to that having the angular U-shaped cross section, and may be formed as having a slit shape by punching or the like on a metal plate as long as the first guide roller 90 may be guided. A width of the first guide groove 911 is set to be slightly larger than the outer diameter of the first guide roller 90. Positions of the first guide roller 90 are restricted by the first guide groove 911 on both an inner circumferential side and an outer circumferential side along the direction Z intersecting both the transport direction X of the recording sheet 5 and the width direction Y of the recording sheet 5. A diameter of an outer circumference of the first guide groove 911 is smaller than an outer diameter of the sprockets 63, 64. As a result, a circumferential length of the first guide groove 911 is set to be shorter than a circumferential length of a corresponding region of the sprockets 63, 64.

As shown in FIG. 17, the first guide groove 911 in the first guide member 91 is formed in a substantially semicircular shape having an opening width corresponding to the outer diameter of the first guide roller 90. In addition, a central angle of the first guide groove 911 in a circumferential direction is set to be larger than 180°, and the first guide groove 911 is formed in an arc shape that forms an angle larger than a semicircular shape along a counterclockwise direction from upper end portions of the sprockets 63, 64 by a required angle. Further, a straight line portion 911*a* parallel to the moving direction of the chains 67, 68 is continuously provided at an outlet portion of the first guide groove 911. Therefore, the first guide member 91 is configured to be able to guide the chain gripper 70 along the straight line portion 911*a* in a state of holding a required posture of the chain gripper 70 even after passing through an outer circumference of the sprockets 63, 64.

In addition, in the sheet transport device 60 according to the first exemplary embodiment, a second positioning portion is included that positions the chain gripper 70 on both an inner circumferential side and an outer circumferential side along the direction Z intersecting both the transport direction X of the recording sheet 5 and the width direction Y of the recording sheet 5 at a position different from the first positioning portion while the chains 67, 68 move along the sprockets 63, 64.

In the sheet transport device 60 according to the first exemplary embodiment, as shown in FIGS. 9A, 9B, and 10, the two extension pins 861, 862 for mounting the mounting members 71, 72 of the chain gripper 70 on the chains 67, 68 extend outward along the axial direction of the mounting members 71, 72. As shown in FIG. 16, on the extension pin 861 of the two extension pins 861, 862 positioned on the downstream side along the transport direction X of the recording sheet 5, a second guide roller 92 as an example of the second positioning portion is rotatably mounted on and retained in an outside of the chains 67, 68. An outer diameter of the second guide roller 92 is set to be equal to or larger than an outer diameter of the roller 84 of the chains 67, 68.

As shown in FIGS. 8 and 16, the sheet transport device 60 is provided with a second guide member 93 that guides the second guide roller 92. The second guide member 93 is formed of synthetic resin, metal, or the like in a substantially arc shape having a required thickness. As shown in FIG. 6, second guide members 93 are disposed in a state of being fixed to the sheet transport device 60 at positions corresponding to the two end portions of the transfer cylinder 61 in the axial direction.

As shown in FIGS. 16 and 17, a second guide groove 931 as an example of a second guide groove that rotatably guides the second guide roller 92 is formed in an inner side surface of the second guide member 93. A circumferential length of the second guide groove 931 is set to be longer than the circumferential length of the first guide groove 911 and close to the circumferential length of the corresponding region of the sprockets 63, 64.

As shown in FIG. 17, the second guide groove 931 of the second guide member 93 is formed in a substantially arc shape having an opening width corresponding to the outer diameter of the second guide roller 92. A straight line portion 931*a* parallel to the moving direction of the chains 67, 68 is provided at an outlet portion of the second guide groove 931.

The first and second guide rollers 90, 92 are disposed on both sides of the chain gripper 70 along the transport direction X of the recording sheet 5 sandwiching a position of a center of gravity of the chain gripper 70.

A position of the center of gravity G of the chain gripper 70 is different depending on a material (weight) and shape of the mounting members 71, 72, the claw drive shaft 74, the claw receiving member 75, and the like that form the chain gripper 70. However, as shown in FIG. 10, the position of the center of gravity G of the chain gripper 70 is positioned at an intermediate position between the long claw drive shaft 74 substantially made of a heavy member such as metal and the long claw receiving member 75, and is at an obliquely upper position slightly closer to the claw receiving member 75 relative to the outer circumference of the claw drive shaft 74.

In the chain gripper 70 in the first exemplary embodiment, the first guide roller 90 is disposed at the end portion of the claw drive shaft 74 along the axial direction, and the second guide roller 92 is disposed at an end portion of the extension pin 861 along the axial direction that is an upper end portion of the horizontal plate portion 722*a* of the fixing portion 722.

Therefore, as shown in FIG. 10, when coordinates with the center of gravity G of the chain gripper 70 as an origin is considered, the first guide roller 90 is positioned on a downstream side of the center of gravity G along the transport direction X of the recording sheet 5 and below the center of gravity G along the direction Z intersecting the width direction Y of the recording sheet. Then, the second guide roller 92 is positioned on an upstream side of the center of gravity G along the transport direction of the recording sheet 5 and above the center of gravity G along a vertical direction. That is, the first and second guide rollers 90, 92 are disposed on a diagonal line at coordinates with the center of gravity G of the chain gripper 70 as the origin.

Therefore, when the chain gripper 70 is guided by and moves along the first and second guide rollers 90, 92, the center of gravity G is at a position close to a straight line connecting centers of the first guide roller 90 and the second guide roller 92. Therefore, when the chain gripper 70 is guided by and moves along the first and second guide rollers 90, 92, an action of a rotational moment around the center of gravity G is prevented, and even when the chain gripper 70 is guided by the first and second guide rollers 90, 92, the chain gripper 70 may be stably moved.

Further, in the sheet transport device 60 according to the first exemplary embodiment, a third positioning portion is included that positions the chain gripper 70 on the both sides along the width direction Y of the recording sheet 5 intersecting the transport direction X of the recording sheet 5 while the chains 67, 68 move along the sprockets 63, 64.

As shown in FIGS. 10 and 16, a third guide roller 94, which is an example of a third positioning portion, is rotatably mounted on a lower end portion of the fixing portion 722 of the mounting members 71, 72 of the chain gripper 70. A rotating shaft 729 for rotatably mounting the third guide roller 94 toward a center of the transfer cylinder 61 is integrally provided on the lower end portion of the fixing portion 722. The cylindrical third guide roller 94 having a required outer diameter is rotatably mounted on and retained in the rotating shaft 729. The outer diameter of the third guide roller 94 is set to be equal to a thickness of the fixing portion 722.

As shown in FIG. 10, the third guide roller 94 is disposed on an extension of a perpendicular line drawn between the two extension pins 861, 862. Therefore, the chain gripper 70 is guided by the third guide roller 94 directly below a position where a moving force of the chains 67, 68 connected via the two extension pins 861, 862 acts. Therefore, when the chain gripper 70 moves along the sprockets 63, 64 by the chains 67, 68, displacement of the recording sheet 5 along the width direction Y is immediately restricted at the position where the moving force of the chains 67, 68 acts.

As shown in FIGS. 6 and 16, the sheet transport device 60 is provided with a third guide member 95 that guides the third guide roller 94 on the fixing portion 722. The third guide member 95 is formed of synthetic resin, metal, or the like in a circular shape having a required thickness. As shown in FIG. 6, the third guide member 95 is fixed only to one end portion of the transfer cylinder 61 along the axial direction. The third guide member 95 rotates together with the transfer cylinder 61.

As shown in FIGS. 16 and 17, a third guide groove 951 as an example of a third guide groove that rotatably guides the third guide roller 94 is formed in an outer circumferential end surface of the third guide member 95. An open upper end portion of the third guide groove 951 is formed in a tapered shape. A circumferential length of the third guide groove 951 is set to be shorter than the circumferential length of the first guide groove 911.

As shown in FIGS. 16 and 17, the third guide groove 951 of the third guide member 95 is formed in a concave shape having an opening width corresponding to the outer diameter of the third guide roller 94.

<Operation of Sheet Transport Device>

In the image forming apparatus 1 to which the sheet transport device 60 according to the first exemplary embodiment is applied, as described below, transport accuracy of the recording sheet 5 held and transported by the chain gripper 70 is improved as compared with a case where the first positioning portion is not included that positions the chain gripper 70 provided on the chains 67, 68 on the both sides along the direction Z intersecting both the transport direction X of the recording sheet 5 and the width direction Y of the recording sheet 5.

That is, in the image forming apparatus 1 to which the sheet transport device 60 according to the first exemplary embodiment is applied, as shown in FIG. 1, the toner images of yellow (Y), magenta (M), cyan (C), and black (K) transferred onto the intermediate transfer belt 31 are secondarily transferred onto the recording sheet 5 transported by the sheet transport device 60 at the secondary transfer position T2.

At this time, as shown in FIGS. 15A, 15B, 15C and 15D, in the sheet transport device 60, the chain gripper 70 mounted on the chains 67, 68 moves along the sprockets 63, 64 around which the chains 67, 68 are wound.

For the chain gripper 70, when the chains 67, 68 are wound around the sprockets 63, 64 respectively mounted on the two end portions of the transfer cylinder 61 along the axial direction as shown in FIG. 4, the first guide roller 90 provided on the mounting member 72 is guided by the first guide groove 911 in the first guide member 91 as shown in FIGS. 16 and 17. Accordingly, positions of both the inner circumferential side and the outer circumferential side of the chain gripper 70 along the direction Z intersecting both the transport direction X of the recording sheet 5 and the width direction Y of the recording sheet 5 are restricted.

At the same time, the third guide roller 94 provided on the mounting member 72 is guided by the third guide groove 951 of the third guide member 95, and positions of both (inner and outer) sides of the chain gripper 70 along the width direction Y of the recording sheet 5 intersecting the transport direction X of the recording sheet 5 are restricted.

Thereafter, the second guide roller 92 provided on the mounting member 72 is guided by the second guide groove 931 in the second guide member 93, and positions of the both sides of the chain gripper 70 along the direction Z intersecting both the transport direction X of the recording sheet 5 and the width direction Y of the recording sheet 5 are restricted.

Figure 18:
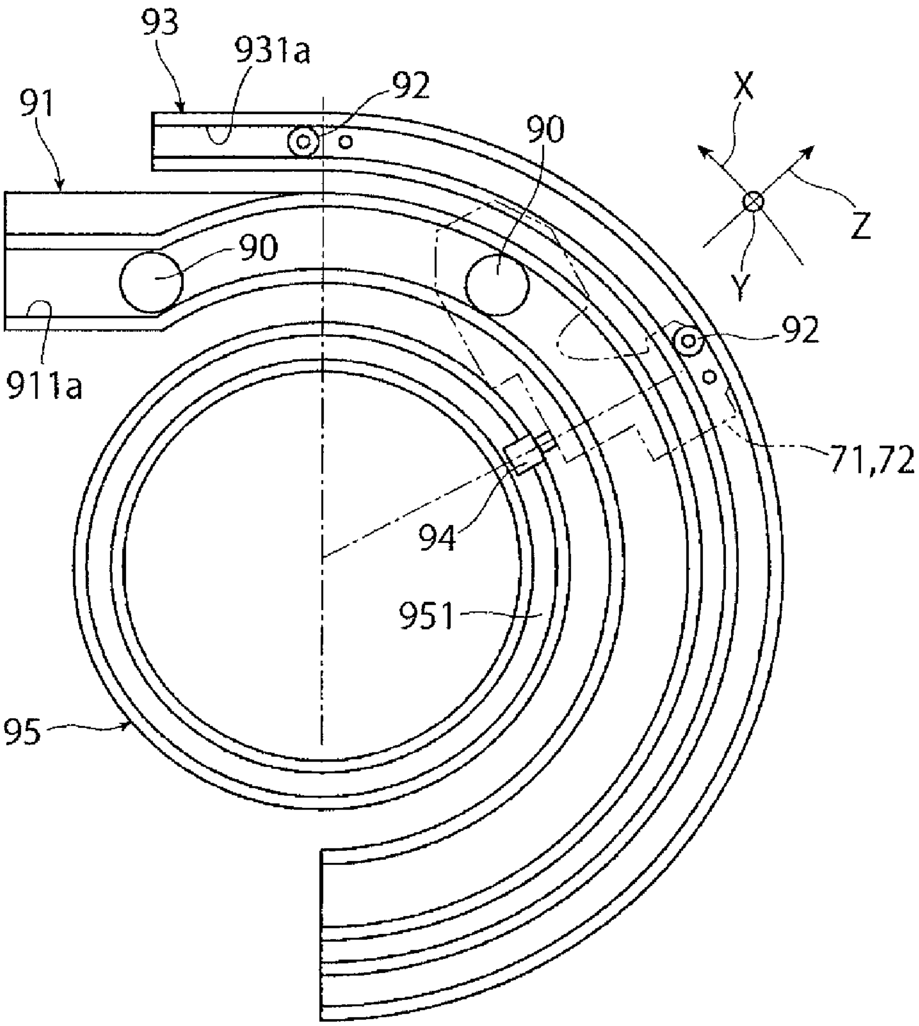
FIG. 18 is a configuration diagram showing an operation of the sheet transport device according to the first exemplary embodiment.

Further, as shown in FIG. 18, the chain gripper 70 moves to the holding position of the recording sheet 5 and the secondary transfer position T2 in accordance with the rotation of the sprockets 63, 64.

As described above, at both the holding position of the recording sheet 5 and the secondary transfer position T2, the first guide roller 90 provided on the mounting member 72 is guided by the first guide groove 911 in the first guide member 91. Accordingly, the positions of both (inner and outer) sides of the chain gripper 70 along the direction Z intersecting both the transport direction X of the recording sheet 5 and the width direction Y of the recording sheet 5 are restricted.

At the same time, the third guide roller 94 provided on the mounting member 72 is guided by the third guide groove 951 in the third guide member 95, so that the positions of the both (inner and outer) sides of the chain gripper 70 along the width direction Y of the recording sheet 5 intersecting the transport direction X of the recording sheet 5 are restricted.

Further, the second guide roller 92 provided on the mounting member 72 is guided by the second guide groove 931 in the second guide member 93, so that the positions of the both sides of the chain gripper 70 along the direction Z intersecting both the transport direction X of the recording sheet 5 and the width direction Y of the recording sheet 5 are restricted.

Thus, the positions of both the inner circumferential side and the outer circumferential side of the chain gripper 70 along the direction Z intersecting both the transport direction X of the recording sheet 5 and the width direction Y of the recording sheet 5 are restricted by the first and second guide rollers 90, 92, and the positions of both the inner circumferential side and the outer circumferential side of the chain gripper 70 along the width direction Y of the recording sheet 5 intersecting the transport direction X of the recording sheet 5 are restricted by the third guide roller 94.

Therefore, even when the chains 67, 68 on which the chain gripper 70 is mounted has the gaps (clearance) between the inner plates 81, 82 and the outer plates 87, 88, the gap between the bush 83 and the roller 84, the gap between the pin 86 and the bush 83, and the like, displacement of the chain gripper 70 along the radial direction or the like of the sprockets 63, 64 is prevented.

Therefore, in the sheet transport device 60 according to the first exemplary embodiment, the transport accuracy of the recording sheet 5 held and transported by the chain gripper 70 may be improved as compared with a case where the first and second guide rollers 90, 92 are not included that position the chain gripper 70 mounted on the chains 67, 68 on the both sides along the direction Z intersecting both the transport direction X of the recording sheet 5 and the width direction Y of the recording sheet 5.

Therefore, in the sheet transport device 60 according to the first exemplary embodiment, it may be possible to prevent the transfer failure such as the registration deviation or the skew in the toner image (image) transferred onto the recording sheet 5 at the secondary transfer position T2.

Comparative Example

Figure 19:
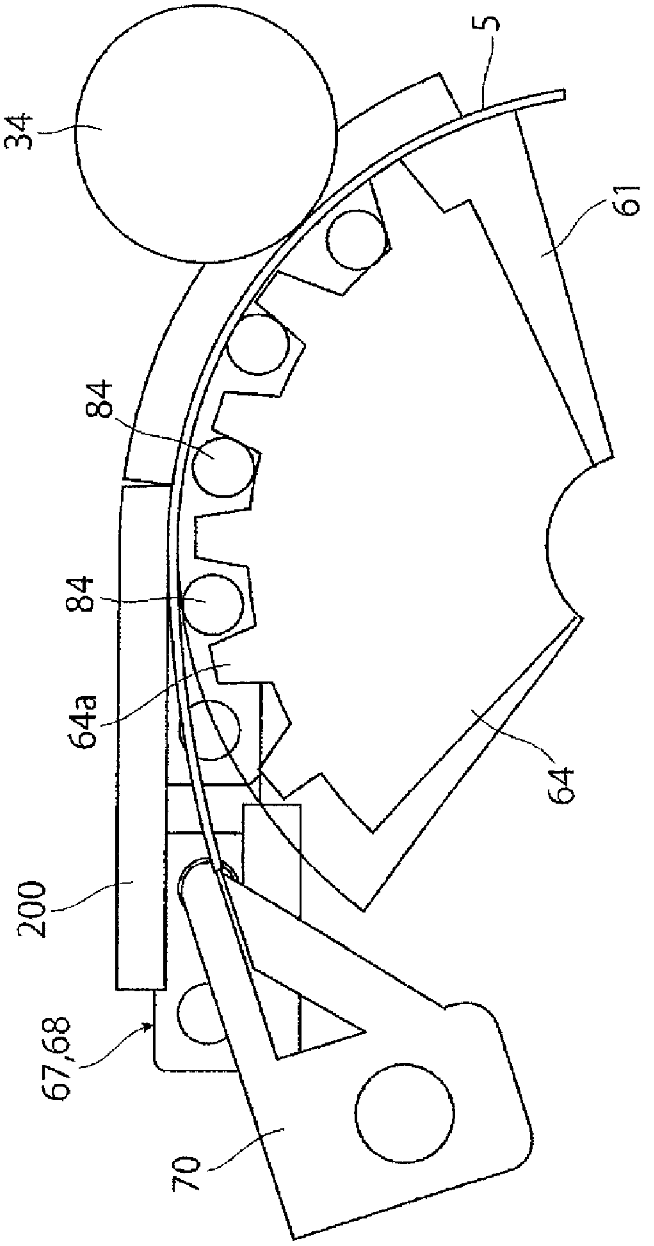
FIG. 19 is a configuration diagram showing parts of the sheet transport device according to a comparative example.
Figure 20:
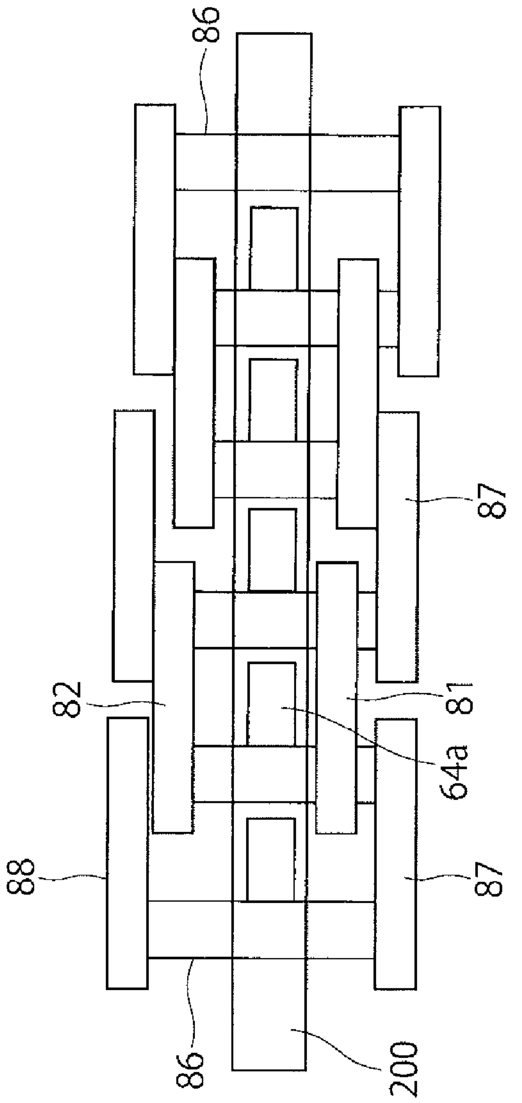
FIG. 20 is a configuration diagram showing parts of the sheet transport device according to the comparative example.

As shown in FIGS. 19 and 20, the comparative example is configured to include a chain guide 200 that is disposed on an outer circumference of the chains 67, 68 and in contact with the roller 84 to guide the chains 67, 68 while the chains 67, 68 move along the sprocket 64. In this comparative example, movement paths of the chains 67, 68 are restricted by the chain guide 200 disposed on the outer circumference of the chains 67, 68.

However, in a case of this comparative example, since a position of the chain gripper 70 is not directly guided, and positions of the chains 67, 68 are restricted by the chain guide 200, when there are gaps (clearance) between the inner plates 81, 82 and the outer plates 87, 88, a gap between the bush 83 and the roller 84, or a gap between the pin 86 and the bush 83, and the like that form the chains 67, 68, the displacement of the chain gripper 70 along the radial direction or the like of the sprocket 64 cannot be prevented.

Second Exemplary Embodiment

Figure 21:
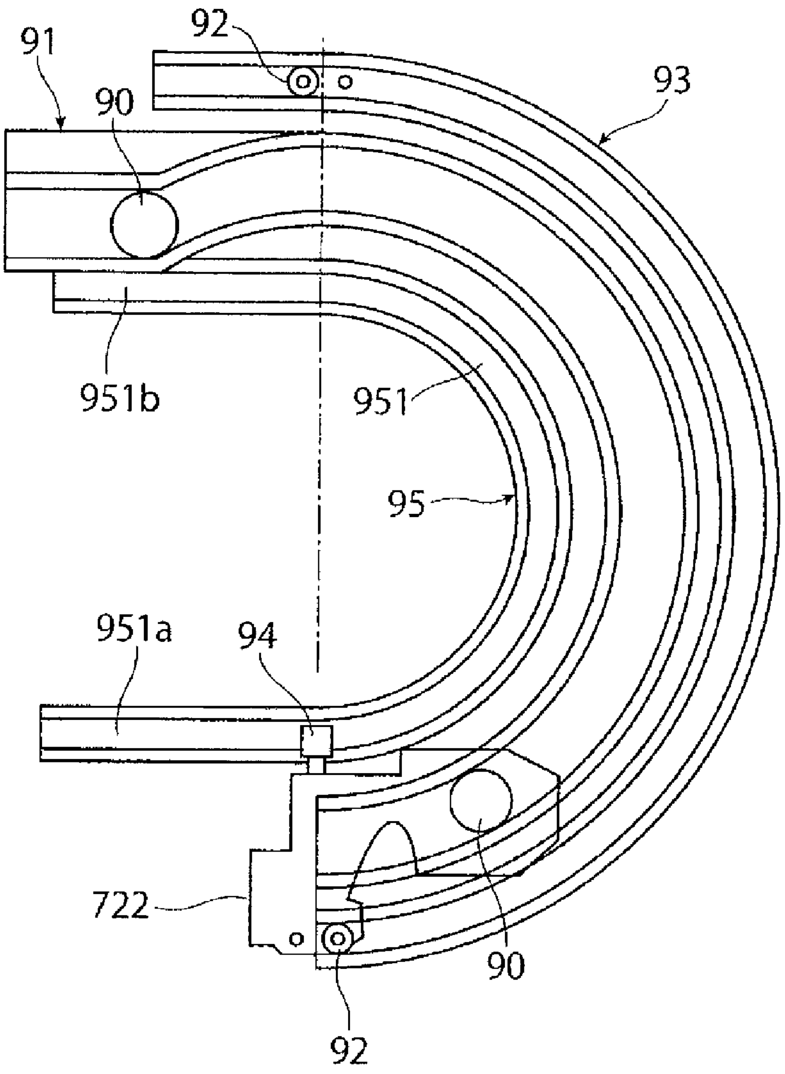
FIG. 21 is a configuration diagram showing parts of the sheet transport device according to a second exemplary embodiment of the present disclosure.

FIG. 21 shows the sheet transport device according to the second exemplary embodiment. The sheet transport device according to the second exemplary embodiment is configured such that the third guide member is mounted on the sheet transport device instead of being mounted on the transfer cylinder.

That is, in the sheet transport device 60 according to the second exemplary embodiment, as shown in FIG. 21, the third guide member 95 that guides the third guide roller 94 provided on the fixing portion 722 of the chain gripper 70 is provided in a state of being fixed to a frame (not shown) of the sheet transport device 60 similarly as the first and second guide members 91, 93. The third guide member 95 is formed of synthetic resin, metal, or the like in a substantially semicircular shape having a required thickness.

Figure 22:
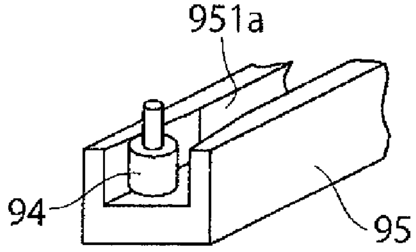
FIG. 22 is a perspective configuration diagram showing parts of the sheet transport device according to the second exemplary embodiment.

In addition, an inlet portion and an outlet portion of the third guide member 95 are respectively provided with third guide grooves 951*a*, 951*b* at an inlet and an outlet that are linearly extended along the moving direction of the chains 67, 68. As shown in FIG. 22, a width of the third guide groove 951*a* provided at the inlet of the third guide member 95 is enlarged so that a tip end portion of the third guide groove 951*a* is tapered. Accordingly, even when the chains 67, 68 that move from the pressurizing cylinder 62 to the transfer cylinder 61 has some positional deviation along the width direction Y of the recording sheet 5, it is possible to reliably guide the third guide roller 94 for the chain gripper 70 to the third guide groove 951 of the third guide member 95.

Since other configurations and operations are similar as those of the first exemplary embodiment, a description thereof is omitted.

In the exemplary embodiments described above, a full-color image forming apparatus including the image forming devices 20 (Y, M, C, K) of yellow (Y), magenta (M), cyan (C), and black (K) is described, but the image forming apparatus may be a monochrome image forming apparatus.

In the exemplary embodiments described above, the image forming device employing the electrophotographic system is described as the image forming unit, but the present disclosure is not limited thereto. As the image forming unit, any unit capable of forming an image on a sheet, such as a unit that forms an image on a sheet by printing, a unit that forms an image on a sheet by an inkjet method, or the like, may be employed.

Further, in the exemplary embodiments described above, cases where all of the first to third positioning portions are provided are described, but it is not always necessary to provide all of the first to third positioning portions. For example, modifications are possible, such as providing only the first and third positioning portions.

In addition, in the exemplary embodiments described above, a positioning portion provided at the end portion of the claw drive shaft is described as the first positioning portion, and a positioning portion provided at the fixing portion of the mounting member is described as the second positioning portion, but the present disclosure is not limited thereto. The positioning portion provided at the end portion of the claw drive shaft may be the second positioning portion, and the positioning portion provided at the fixing portion of the mounting member may be the first positioning portion.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A sheet transport device comprising:

a chain that circulates and moves;

a driving unit that circulates and moves the chain;

a holding unit that is provided on the chain and holds an end portion of a sheet along a transport direction of the sheet; and a first positioning portion that positions the holding unit on both sides along a direction intersecting both the transport direction of the sheet and a width direction of the sheet while the chain moves along the driving unit, wherein the first positioning portion is movably guided along a first guide groove provided along the driving unit, and wherein a circumferential length of the first guide groove is shorter than a circumferential length of the driving unit.

2. The sheet transport device according to claim 1, further comprising:

a second positioning portion that positions the holding unit on both sides along the direction intersecting both the transport direction of the sheet and the width direction of the sheet at a position that is different from a position at which the holding unit is positioned by the first positioning portion while the chain moves along the driving unit.

3. The sheet transport device according to claim 2, wherein the second positioning portion is movably guided along a second guide groove provided along the driving unit.

4. The sheet transport device according to claim 3, wherein the first positioning portion is movably guided along a first guide groove provided along the driving unit, and a circumferential length of the second guide groove is closer to a circumferential length of the driving unit than a circumferential length of the first guide groove.

5. An image forming apparatus comprising:

the sheet transport device according to claim 4; and an image forming unit configured to form an image on a sheet transported by the sheet transport device.

6. The sheet transport device according to claim 3, wherein the first positioning portion and the second positioning portion are disposed on both sides of the holding unit along the transport direction of the sheet sandwiching a position of a center of gravity of the holding unit.

7. An image forming apparatus comprising:

the sheet transport device according to claim 6; and an image forming unit configured to form an image on a sheet transported by the sheet transport device.

8. An image forming apparatus comprising:

the sheet transport device according to claim 3; and an image forming unit configured to form an image on a sheet transported by the sheet transport device.

9. An image forming apparatus comprising:

the sheet transport device according to claim 2; and an image forming unit configured to form an image on a sheet transported by the sheet transport device.

10. The sheet transport device according to claim 1, further comprising:

a third positioning portion that positions the holding unit on both sides of a direction along the width direction of the sheet, the direction intersecting the transport direction of the sheet while the chain moves along the driving unit.

11. An image forming apparatus comprising:

the sheet transport device according to claim 10; and an image forming unit configured to form an image on a sheet transported by the sheet transport device.

12. An image forming apparatus comprising:

the sheet transport device according to claim 1; and an image forming unit configured to form an image on a sheet transported by the sheet transport device.

13. A sheet transport device comprising:

a chain that circulates and moves;

a driving unit that circulates and moves the chain;

a holding unit that is provided on the chain and holds an end portion of a sheet along a transport direction of the sheet;

a first positioning portion that positions the holding unit on both sides along a direction intersecting both the transport direction of the sheet and a width direction of the sheet while the chain moves along the driving unit; and a second positioning portion that positions the holding unit on both sides along the direction intersecting both the transport direction of the sheet and the width direction of the sheet at a position that is different from a position at which the holding unit is positioned by the first positioning portion while the chain moves along the driving unit, wherein the second positioning portion is movably guided along a second guide groove provided along the driving unit, wherein the first positioning portion is movably guided along a first guide groove provided along the driving unit, and wherein a circumferential length of the second guide groove is closer to a circumferential length of the driving unit than a circumferential length of the first guide groove.

14. The sheet transport device according to claim 13, wherein the first positioning portion and the second positioning portion are disposed on both sides of the holding unit along the transport direction of the sheet sandwiching a position of a center of gravity of the holding unit.

15. An image forming apparatus comprising:

the sheet transport device according to claim 14; and an image forming unit configured to form an image on a sheet transported by the sheet transport device.

16. The sheet transport device according to claim 13, further comprising:

a third positioning portion that positions the holding unit on both sides of a direction along the width direction of the sheet, the direction intersecting the transport direction of the sheet while the chain moves along the driving unit.

17. An image forming apparatus comprising:

the sheet transport device according to claim 16; and an image forming unit configured to form an image on a sheet transported by the sheet transport device.

18. An image forming apparatus comprising:

the sheet transport device according to claim 13; and an image forming unit configured to form an image on a sheet transported by the sheet transport device.

* * * * *